(12) United States Patent
Borton et al.

(10) Patent No.: US 10,416,873 B2
(45) Date of Patent: Sep. 17, 2019

(54) APPLICATION SPECIFIC ADAPTION OF USER INPUT ASSIGNMENTS FOR INPUT DEVICES

(71) Applicant: Microsoft Technology Licensing, LLC, Redmond, WA (US)

(72) Inventors: Scott Andrew Borton, Seattle, WA (US); Felix Gerard Torquil Ifor Andrew, Seattle, WA (US); David Grochocki, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/595,790

(22) Filed: May 15, 2017

(65) Prior Publication Data

US 2018/0329599 A1    Nov. 15, 2018

(51) Int. Cl.
*G06F 3/0487*  (2013.01)
*G06F 3/06*  (2006.01)
*G06F 3/0488*  (2013.01)

(52) U.S. Cl.
CPC ............ *G06F 3/0487* (2013.01); *G06F 3/067* (2013.01); *G06F 3/0625* (2013.01); *G06F 3/0634* (2013.01); *G06F 3/0488* (2013.01)

(58) Field of Classification Search
CPC .... G06F 3/0487; G06F 3/0625; G06F 3/0634; G06F 3/067; G06F 3/033; G06F 3/0488
See application file for complete search history.

(56) References Cited

U.S. PATENT DOCUMENTS

| | | |
|---|---|---|
| 7,752,555 B2 | 7/2010 | Sutanto et al. |
| 8,676,406 B2 | 3/2014 | Coffman et al. |
| 8,918,737 B2 | 12/2014 | Takahashi |
| 9,128,555 B2 * | 9/2015 | Lee ........................ G06F 1/1643 |
| 9,235,338 B1 | 1/2016 | Barr et al. |
| 9,411,505 B2 | 8/2016 | SanGiovanni et al. |
| 2010/0302176 A1 | 12/2010 | Nikula et al. |
| 2015/0116205 A1 * | 4/2015 | Westerman ............ G06F 3/016 |
| | | 345/156 |

OTHER PUBLICATIONS

"Gamepad and remote control interactions", https://docs.microsoft.com/en-us/windows/uwp/input-and-devices/gamepad-and-remote-interactions, Published on: Feb. 8, 2017, 2 pages.
"Pan and Zoom Controller", http://www.themarslab.org/digital-tools/about-mars-yard-maps/mars-yard-maps-reference/tools-and-navigation/pan-and-zoom-controller/, Retrieved on: Feb. 10, 2017, 2 pages.

* cited by examiner

*Primary Examiner* — Afroza Chowdhury
(74) *Attorney, Agent, or Firm* — Newport IP, LLC; Vernon W. Francissen; Scott Y. Shigeta

(57) ABSTRACT

Techniques are shown for changing input assignments of an input device controls for a first application while leaving assignments unchanged for other applications. When a first application is active, a first input action is registered from activation of an input control selected for mode control. In response, when an input mode of the first application corresponds to standard device mapping inputs, the input mode is changed to an input mode corresponding to an alternate device mapping inputs assigned to a subset of input controls. When the first application is in alternate device mapping mode, input control activations are registered according to the alternate device mapping actions. When a second application is active, input control activations are registered according to the standard input mapping actions.

20 Claims, 13 Drawing Sheets

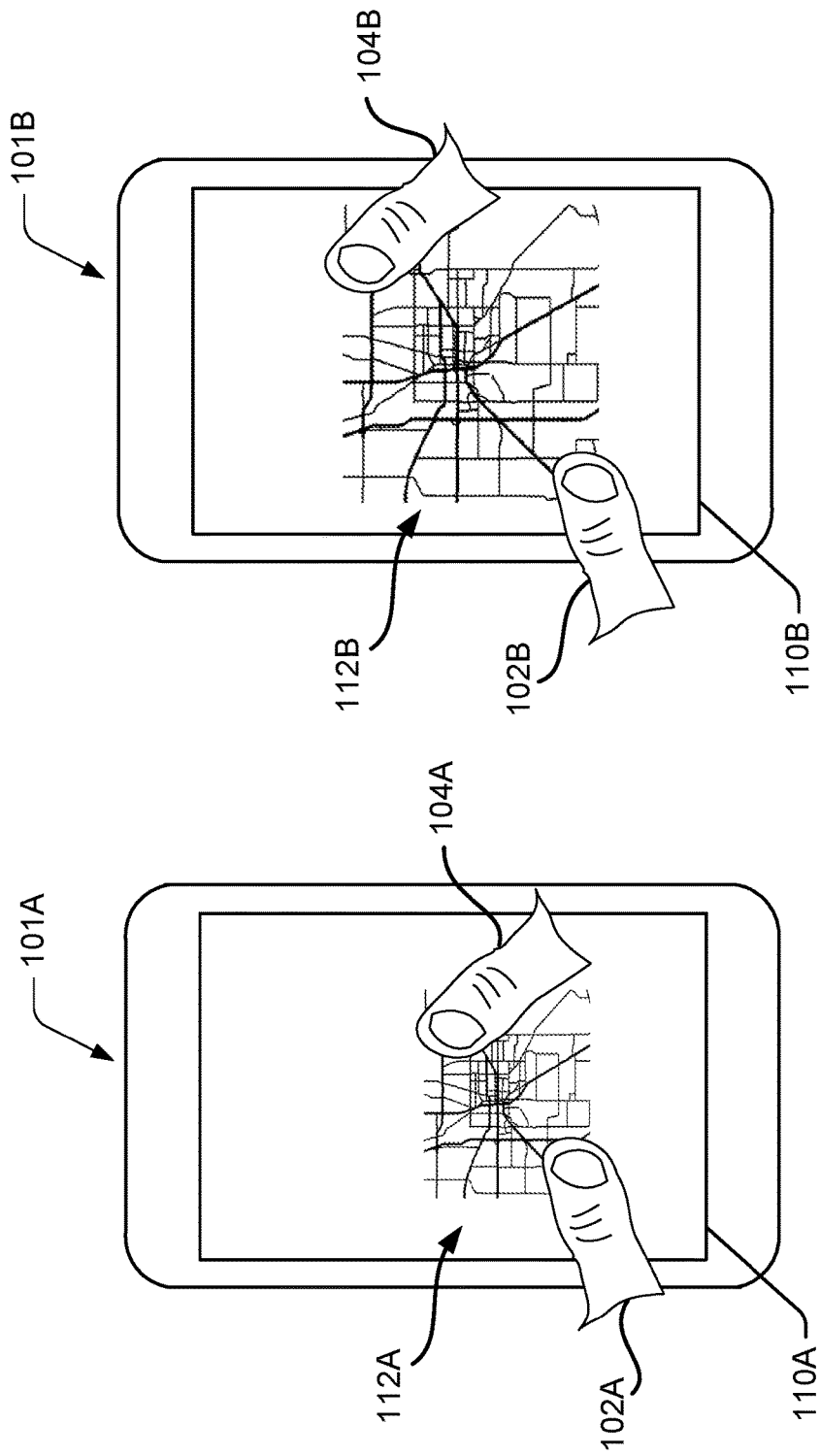

APPLICATION SPECIFIC ADAPTION OF USER INPUT ASSIGNMENTS FOR INPUT DEVICES

BACKGROUND

Currently, many applications utilize a rich input interaction provided by complex user interface devices such as a mouse or touch user interface. A mouse user interface, for example, enables complex user interactions using a click, hold and drag action that permits objects, such as windows or icons, to be moved and/or acted upon on a user interface screen. A touch user interface, by way of another example, provides many complex user interactions based on pinch and zoom gestures.

When a user input device with a more limited set of user controls, such as a game controller, wand, gamepad, or television remote control, is utilized, then it may be difficult or impossible to effectively interact with applications designed for a rich input interaction model. For example, a map application that is easily controlled using a mouse or touch interface is difficult to control using a game controller device.

It is with respect to these and other considerations that the disclosure made herein is presented.

SUMMARY

The techniques disclosed herein adapt input action assignments for input controls of an input device for a specific application or an application sub-element. One aspect of the techniques disclosed herein is directed toward changing input assignments for input controls of input devices, such as buttons, D-pads, for joysticks, for individual applications. In examples of this aspect, a method or system changes input assignments for a first application, but leaves the input assignments unchanged for other applications. These examples involve assigning one of a first plurality of input actions of an input device to each one of a plurality of input controls of an input device and, when a first application is active, registering a first input action of the first plurality of input actions from activation of one of the input controls selected for mode control. Responsive to registering the first input action from activation of the mode control when the first application is active, these examples operate to, when an input mode of the first application is a first state, change the input mode of the first application to a second state and assign a second plurality of input actions to each one of at least a first subset of the input controls. At this point, when the first application is active and the input mode of the first application is the second state, input actions will be registered according to the second plurality of input actions from activation of one of the first subset of the input controls. However, when a second application is active, input actions will be registered in accordance with the first plurality of input actions from activation of one of the first subset of the input controls.

In another aspect of the techniques disclosed herein, the input mode of an application can be stored and used to change the assignment of input actions when the application is reactivated after changing to a different application. An example of a method in accordance with this aspect involves storing the input mode of the first application and, responsive to activation of the second application, assigning the first plurality of input actions to the plurality of input controls. In response to activation of the first application, the method operates to obtain the input mode of the first application and, when the input mode of the first application is the second state, assign the second plurality of input actions to each one of the first subset of the plurality of input controls.

In other aspects of the techniques disclosed herein, a method for assigning alternate input action assignments for input controls of an input device that are application specific involves identifying a type of the input device, checking for a data entry that identifies a standard mapping corresponding to the type of the input device, and assigning input actions of the standard mapping to the input controls of the input device. This aspect of the present techniques further involves identifying a first application that is active, checking for a data entry that maps a combination of the identified first application and the identified type of the input device to a corresponding alternate input mapping, and, when an entry is found for the identified first application and the identified type of the input device, obtaining the corresponding alternate input mapping. When the first application is active, this aspect of the techniques calls for assigning each input action of the corresponding alternate input mapping to one of the input controls of the input device and registering an input action according to the corresponding alternate input mapping from activation of one of the input controls of the input device. However, when a second application is active, this aspect involves registering an input action according to the standard mapping from activation of one of the input controls of the input device.

Still other aspects of the techniques disclosed herein can also include a mode control and multiple states for an application. For example, an example of a method includes, when the first application is active, registering a first mode control input action from activation of one of the input controls selected for mode control. Responsive to registering the first mode control input action when the first application is active, when an input mode of the first application is a first state, the method operates to change the input mode of the first application to a second state, assign another alternate input mapping to at least a first subset of the input controls, and, when the first application is active and the input mode of the first application is the second state, register a first input action according to the another alternate mapping from activation of one of the first subset of the input controls.

In still other aspects of the techniques disclosed herein, a server or cloud based system includes at least a first processor and a first memory in communication with the first processor. The first memory has computer-readable instructions stored on it that, when executed by the first processor, cause it to operate so as to assign one of a first plurality of input actions to each one of the plurality of input controls of an input device. When a first application is active, the processor operates to receive a first user control signal corresponding to one of the input controls selected for mode control and, responsive thereto, register a first input action of the first plurality of input actions from activation of the mode control. Responsive to registering the first input action from activation of the mode control when the first application is active, when an input mode of the first application is a first state, the processor operates to change the input mode of the first application to a second state and assign a second plurality of input actions to each one of at least a first subset of the input controls. When the first application is active and the input mode of the first application is the second state, the processor operates to register a first input action according to the second plurality of input actions from activation of a first one of the first subset of the input controls, process the first input action, and communicate a result of the processing of the first input action to a client device for display. When a second application is active, the processor operates to register a second input action in accordance with the first plurality of input actions from activation of the first one of the first subset of the input controls, process the second input action, and communicate a result of the processing of the second input action to the client device for display.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIGS. 1A-1B are schematic diagrams showing illustrative examples of complex user input actions on a touch screen interface;

DETAILED DESCRIPTION

Figure 2A:
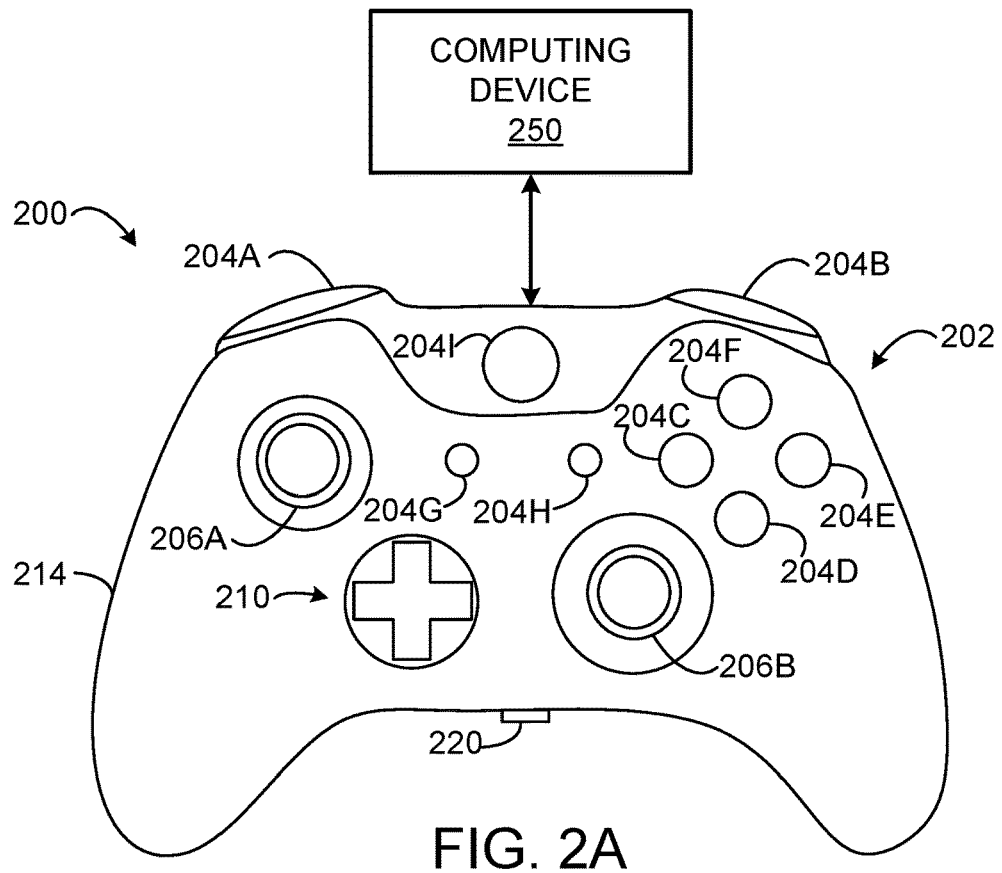
FIGS. 2A-2B are schematic diagrams showing an illustrative example of a user interface device with limited user controls.

The following Detailed Description describes technologies enabling application specific adaptation of user input assignments for an input device. Conventionally, input devices typically have a standard device mapping of input actions to the user controls of the input device and the standard device mapping applies to all applications that utilize the input device. However, the standard device mapping can involve input actions that are not suitable for use with some applications. The techniques described below are directed to several approaches to selecting alternative input mappings of input actions to the user controls of the input device that apply to specific applications or application sub-elements without impacting the input action mapping for other applications or application sub-elements.

In one simplified example, a method or system changes input assignments for a first application, but leaves the input assignments unchanged for other applications. For example, a standard device mapping for an input device assigns each of a plurality of input actions of the standard device mapping to each one of a plurality of input controls of the input device. When a first application is active, e.g. an active or foreground window in which a user is currently working, a first input action is registered from activation of one of the input controls that is selected for input mode control. Responsive to registration of the input action for the mode control, when an input mode of the first application is a first state corresponding to the standard device mapping inputs, the input mode is changed to a second state corresponding to an alternate input mapping that includes a second plurality of input actions, each of which is assigned to one of at least a subset of the input controls. When the first application is active and the input mode is the second state, input actions will be registered according to the second plurality of input actions of the alternate input mapping from activation of any one of the subset of input controls. However, when a second application is active, input actions are registered in accordance with the first plurality of input actions of the standard input mapping from activation of anyone of the first subset of the input controls.

In some examples, if the input action for the mode control is registered when the first application is active and in the second state, then the standard input mappings are restored by changing the input mode to the first state and assigning the first plurality of input actions of the standard input mapping to the first subset of input controls.

In some additional examples, an application may have multiple alternate input mappings. When the application is active, activation of the input mode control will change the input mode state for the application, where each input mode state has a corresponding alternate input mapping. When the application is active and in a particular input mode state, then the corresponding alternate input mapping is assigned to at least a subset of the input controls of the input device. Repeated activation of the input mode control can cause the input mode state to traverse through each state of the application and return to the standard input mapping in, for example, a round robin fashion.

In some configurations, different elements of an application, such as windows, icons or documents, may have different alternate input mappings. In this illustrative example, when an application sub-element is active, activation of the input mode control will change an input mode state of the application sub-element and assign an alternate input mapping of input actions to input user controls for the application sub-element. The input state of the application sub-element may be stored and, each time the application sub-element is activated, the input state of the application sub-element is obtained and the alternate input mapping corresponding to the input state is restored to the input actions of the input user controls.

An application sub-element can be a section or module of an application that provides a specific set of functionality. For instance, an application can have a first application sub-element that has a first set of functionality for editing text, and a second application sub-element that has a second set of functionality for viewing image data. In another example, an application may have a first application sub-element associated with one window for viewing map image data, a second application sub-element associated with another window showing traffic alert text, and a third application sub-element associated with yet another window showing traffic camera image data.

In another aspect of the techniques disclosed herein, the input mode of an application can be stored and used to change the assignment of input actions when the application is reactivated after control is changed to a different application. An example of a method in accordance with this aspect involves storing the input mode of the first application and, responsive to activation of the second application, assigning the first plurality of input actions of the standard input mapping to the plurality of input controls of the input device. Later, when the first application is once again activated, the method operates to obtain the input mode of the first application and, when the input mode of the first application is the second state, assign the second plurality of input actions to each one of the first subset of the plurality of input controls.

In another illustrative example, an alternative input mapping may be assigned to the input user controls of an input device for a specific application based on the type of device and the application. In this example, application and device input mapping data is provided that maps particular application and device type combinations to alternate input mappings. When an application is activated, the application identifier and device type is used to check for an entry in the application and device input mapping data. If an entry is found, the alternate input mapping identified in the entry is used to obtain the alternate input mapping data and the plurality of input actions of the alternate input mapping is assigned to the input user controls of the input device.

This is a simplified example and many factors may be considered in application specific adaptation of user input assignments for an input device as will be discussed in greater detail below. In some configurations, the techniques disclosed herein identify an alternative input action mapping based on a combination of a particular device and a particular application.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In order to make some input devices more effective for use with certain applications, it can be useful to assign an alternate input mapping in place of a standard device mapping in order to map user input control activations to input actions for a particular application without changing the input mappings for other applications. In some configurations, an input mode state of an application may be changed by activation of a user control selected for input mode control. Activation of the input mode control changes the input mode state of the application from a first state, e.g. standard input state, to a second state, e.g. alternate input state, and an alternate input mapping is assigned to at least a subset of the user controls of the input device. When the application is in the second state, input actions are processed in accordance with the alternate input mapping. However, when another application is activated, the input actions will be processed in accordance with the standard input mapping.

By the use of the technologies described herein, input action mappings may be adapted to improve a user's ability to control an application when standard input actions for an input device are insufficient or unsuitable for the application. Such technologies can improve user interaction with a computing device by changing the input actions of the user input controls of an input device for one application, but apply the original input action assignments to other applications. Certain configurations may be beneficial in assisting users to activate different alternate input mappings of input actions for input user controls for different applications. Among many benefits provided by the technologies described herein, a user's interaction with an application may be improved by providing for the assignment of more suitable input actions for the particular application when utilizing a particular input device. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for application specific adaptation of user input assignments for an input device will be described. As will be described in more detail below with respect to FIGS. 8-10, there are a number of applications and services that may embody the functionality and techniques described herein.

FIGS. 1A-1B are schematic diagrams showing illustrative examples of complex user input actions on a touch screen interface utilized with a mapping application. This example illustrates a zoom action in the mapping application executing on a smartphone 101A, 101B. The smartphone 101A, 101B has a touchscreen 110A, 110B, on which a user's fingers 102A, 104A, 102B, 104B are used to control the application. In the diagram of FIG. 1A, the smartphone 101A has a map image 112A with a user's fingers 102A and 104A positioned on the image 112A on touchscreen 110A. To expand image 112A, the user moves her fingers 102A and 104A away from one another on the touchscreen to the positions indicated in FIG. 1B at 102B and 104B. The relative motion of the user's fingers expands or zooms the map image as shown at 112B on touchscreen 110B.

The touch inputs to the touchscreen provide a rich set of user inputs. For example, the position of the fingers on the touchscreen are user inputs that can determine the image area to be acted upon while the relative motion and direction of the fingers are user inputs that can determine the amount of zoom in or out on the image and, in some examples, rotation of the image. Similarly, computer mouse inputs can also provide a rich set of user inputs based on position and movement of the cursor and operation of mouse buttons, such as click-hold-and-drag to move an object or a zoom in or out using a scroll wheel.

An application that requires rich input interaction via mouse or touch (such as pinch/zoom gestures, or click-and-hold-and-drag for mouse) often may not be effectively used with a more limited input device, such as a game console gamepad, game controller, wand, or television remote.

Figure 2B:
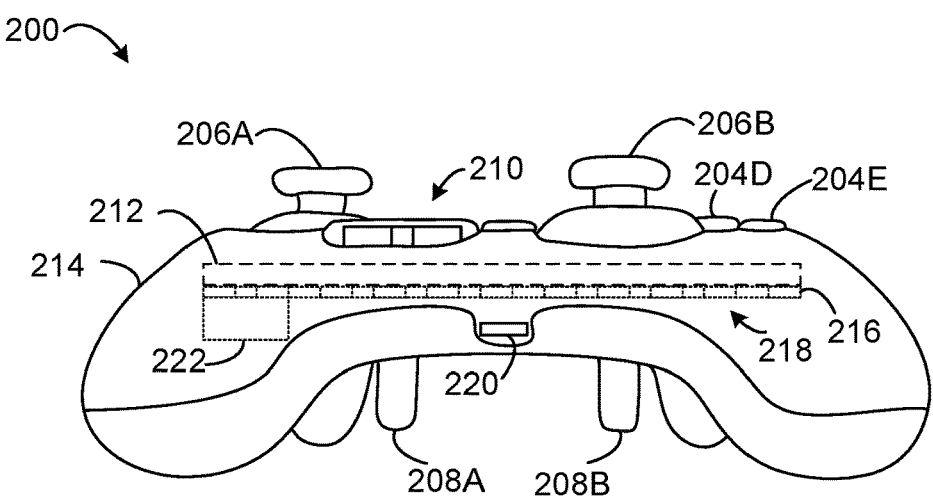

FIGS. 2A and 2B are schematic diagrams showing an example of a game controller 200 user interface device. The game controller 200 may be configured to translate user input into control signals that are provided to a computing device 250, such as a gaming console. The control signals may be mapped to commands to control a video game or perform other operations. For example, the game controller 200 may be configured to send control signals via a wired or wireless connection with the computing device 250. The computing device 250 and/or the game controller 200 may be configured to map different control signals to different commands based on settings of the computing device 250 and/or the game controller 200.

In some implementations, the game controller 200 may be configured to map (or remap) control signals to commands and send the commands to the computing device 250. In other words, the mapping of control signals to commands may be performed locally on-board the game controller 200. But control signals are often mapped to commands in a computing device, such as the computing device 250.

The game controller 200 includes a plurality of controls 202 configured to generate different control signals responsive to finger manipulation. In particular, the plurality of controls 202 includes a plurality of action buttons 204 (e.g., 204A, 204B, 204C, 204D, 204E, 204F, 204G, 204H, and 204I), a plurality of joysticks 206 (e.g., a left joystick 206A and a right joystick 206B), a plurality of triggers 208 (e.g., a left trigger 208A and a right trigger 208B), and a directional pad 210. The game controller 200 may include any number of controls, any type of controls, any number of electronic input sensors, and any type of electronic input sensors without departing from the scope of this disclosure.

The plurality of controls 202 may be coupled to one or more frames 212. The frame 212 may be contained in a housing 214 of the game controller 200. One or more printed circuit boards 216 may be coupled to the frame 212. The printed circuit board 216 may include a plurality of electronic input sensors 218. Each electronic input sensor 218 may be configured to generate an activate control signal responsive to interaction with a corresponding control 202. Non-limiting examples of electronic input sensors may include dome switches, tactile switches, Hall Effect sensors, potentiometers, and other electronic sensing components. Any suitable sensor may be implemented in the game controller 200. In some implementations, two or more printed circuit boards may be used.

Each of the action buttons 204 may be configured to activate a corresponding electronic input sensor 218 to generate an activate control signal responsive to being depressed (e.g., via finger manipulation). Each of the joysticks 206 may be configured to provide two-dimensional input that is based on a position of the joystick in relation to a default "center" position. For example, the joysticks may interact with electronic input sensors in the form of potentiometers that use continuous electrical activity to provide an analog input control signal. Each of the triggers 208 may be configured to provide a variable control signal based on a position of the trigger relative to a default position. For example, as a trigger is pulled farther away from the default position a characteristic of the generated control signal may increase in magnitude.

The directional pad 210 may be configured to reside in a default posture when no touch force is applied to the directional pad 210. In the default posture, the directional pad 210 does not cause any of the plurality of electronic input sensors 218 to generate an activate control signal indicative of touch input. Further, the directional pad 210 may be configured to move from the default posture to a selected activation posture responsive to a touch force being applied to the directional pad 210. The selected activation posture may be one of a plurality of different activation postures that each generate a different activate control signal or combination of activate control signals by interfacing with different electronic input sensors.

Note that an activation signal produced by an electronic input sensor 218 when a corresponding control 202 is in an activation posture may be any signal that differs from a signal or lack thereof produced by the electronic input sensor 218 in the default posture. For example, in some implementations, the activation signal may correspond to a supply voltage (e.g., VDD) of the game controller 200 and the signal produced in the default state may correspond to a relative ground. (e.g., 0). In other implementations, the activation signal may correspond to a relative ground and the signal produced in the default state may correspond to the supply voltage of the game controller 200.

In the depicted implementation, the directional pad 210 can be actuated in four different directions (e.g., up, down, left, and right) to interface with different electronic input sensors that generate different activate control signals. In some implementations, the four different directions may correspond to four different activation postures that generate four different activate control signals to provide four-way directional input. In some implementations, combinations of activate control signals corresponding to pressing the directional pad 210 in two directions (e.g., up and left) at one time may be interpreted as additional activation postures corresponding to diagonals in between the four directions to provide eight-way directional input. In some implementations, the directional pad 210 may include a number of directions different than four or eight. For example, the directional pad 210 may include two or more different directions. The game controller 200 includes an accessory interface 220 configured to removably affix an external accessory to the game controller 200.

As used herein, "machine" means physical data-storage and processing hardware programmed with instructions to perform specialized computing operations. It is to be understood that two or more different machines may share hardware components. For example, the same integrated circuit may be part of two or more different machines.

Despite the many input controls on the game controller 200 shown in FIGS. 2A and 2B, it may not match the variety and manner of inputs achievable through a touch screen or mouse. In the techniques described herein, a computing device is configured to receive command signals from a user input device and provide alternate input mappings to provide input control actions that facilitate use of the application program with a limited user input device. The alternate mappings can be dynamically selected by a user and can be specific to the application programs or application sub-elements. In other words, a user can, for example, select an alternate input mapping for a specific application or a specific window or document of an application without affecting the input mapping for other applications or sub-elements.

Figure 3:
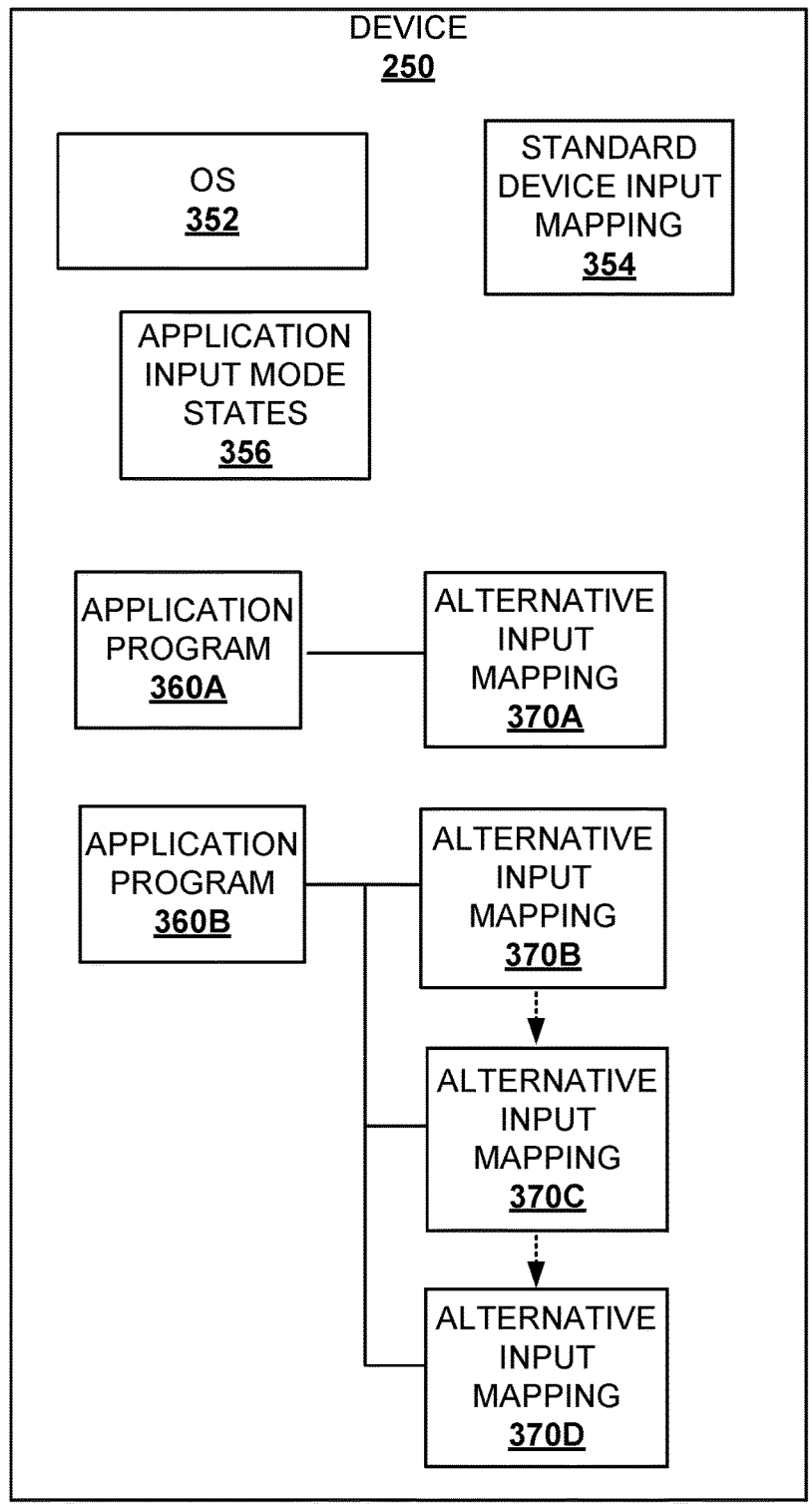
FIG. 3 is a block diagram showing an illustrative example of a software architecture for application specific adaptation of user input assignments for an input device.

FIG. 3 is a block diagram showing an illustrative example of a software architecture in a computer device 250 for application specific adaptation of user input assignments for an input device according to the techniques described herein. An operating system 352 executing, for example, in computer device 250 has access to standard device input mapping data 354 for a game controller 200, which is in wired or wireless communication with device 250. In this example, the standard device input mapping data is a mapping of control inputs to commands that is provided by the manufacturer of the game controller 200. The standard device input mapping would be used by OS 352 to assign a first set or plurality of input actions to individual input controls of the input device.

In the example of FIG. 3 with the approach described herein, alternate input mappings 370 are provided for at least some application programs 360. In the example shown, application program 360A has alternative input mapping 370A that may be selected for use with the application. Application 360B has three possible alternate input mappings 370B, 370C and 370D provided for use with the application. The standard and alternate mapping can be defined for a user input device in a file using a user interface markup language, such as an Extensible Application Markup Language (XAML) file, or similar device mapping definition approach.

Figure 4A:
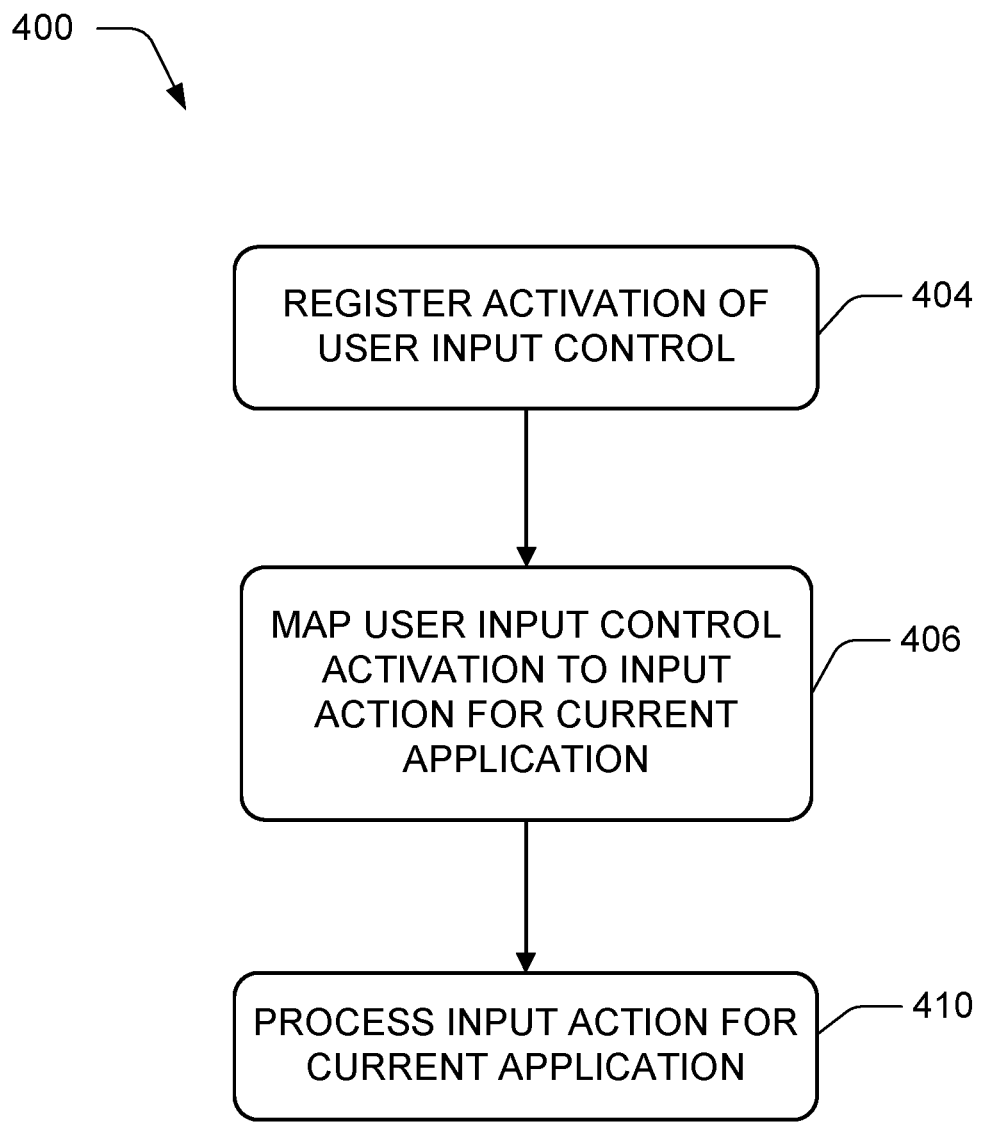
FIGS. 4A and 4B are flow diagrams showing an illustrative example of a routine for processing user control activations of a user input device.

Thus, as illustrated in the flow diagram of FIG. 4A, a simplified routine 400 for receiving and processing an input control activation is shown. At 404, a control signal indicating activation of a particular user input control sensor, such as a button 206, is registered or received in the game console 250. At 406, the control signal is mapped or translated to a command in accordance with the device input mapping in use by OS 352. In a conventional system, the standard device input mapping 354 would be used by OS 352 to interpret the control input signals of the game controller 200 for all applications and sub-elements hosted by the game console 250. At 410, the command mapped from the input action is processed by an application active on computing device 250, such as a game application hosted on a game console.

By way of background, an active application is generally the application with which a user is currently working. In a Windows context, an example of an active application is an application that is running in the foreground window or thread of the operating system. In other words, the thread that created the window with which the user is currently working is called the foreground or active thread, and the window is called the foreground or active window. The GetForegroundWindow function in a Windows OS will retrieve a handle to the foreground window. An active window is the top-level window of the application with which the user is currently working and only one top-level window in the system is active at a time. The user sets the foreground window by clicking or selecting a window, or by using the ALT+TAB or ALT+ESC key combination. When the activation changes from a top-level window of one application to the top-level window of another application, the system sends a WM_ACTIVATEAPP message to both applications, notifying them of the change. When the activation changes to a different top-level window in the same application, the system sends both windows a WM_ACTIVATE message.

Figure 4B:
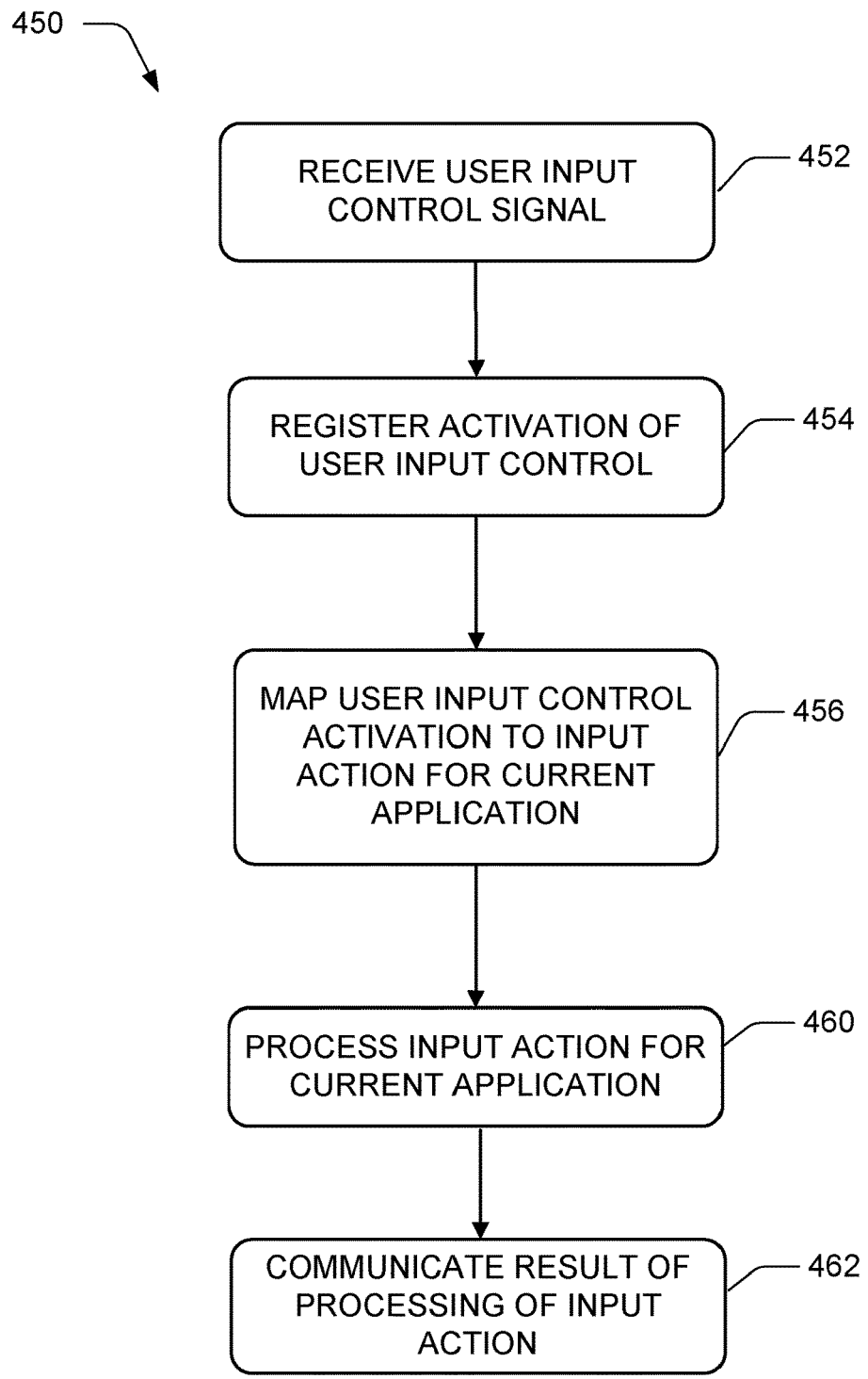

FIG. 4B is a flow diagram illustrating another example of a routine 450 for receiving and processing an input control activation, such as can occur in an architecture where user input control signals are communicated to a remote device, such as a server or a cloud resource, where an application can be hosted and the result of the processing of the user input action is returned to a client device, such as a handheld computing device or game console, for display or another utilization. At 452, a user input control signal is received from a user input device, such as a game controller or a mobile phone. At 454, the received user input control signal indicating activation of a particular user input control sensor, such as a button 206, is registered in the remote device. At 456, the control signal is mapped or translated to a command in accordance with the device input mapping in use by OS 352. At 460, the command mapped from the input action is processed by an application active on the remote device, such as a game application hosted on a server or cloud resource. At 462, the results of the processing of the input action by the application can be communicated to a client device, such as a mobile phone or game console, for display to a user, for example, or another utilization. This approach can, for example, permit remote resources to be utilized to support an application by receiving and processing user inputs with the output of the application being sent to a user device for display.

Referring again to the example of FIG. 3 with the approach described herein, alternate input mappings 370 are provided for at least some application programs 360. In the example shown, application program 360A has alternative input mapping 370A that may be selected for use with the application. Application 360B has three possible alternate input mappings 370B, 370C and 370D provided for use with the application. The standard and alternate mapping can be defined for a user input device in a file using a user interface markup language, such as an Extensible Application Markup Language (XAML) file, or similar device mapping definition approach.

In addition, in order to provide alternate input mappings for applications or application sub-elements in accordance with the present approach, OS 352 maintains data indicating application input mode states 356. This data indicates the current state for each application or sub-element. Thus, for example, when application program 360A is selected for active user input, OS 352 checks the input mode state for application program 360A in the application input mode states data 356 and, based on the current input mode state for the application, can reassign user input actions according to alternative input mapping 370A if indicated by the current state.

Similarly, input mode state data is maintained for application program 360B such that, when the application is activated, OS 352 can reassign user input actions according to one of alternative input mappings 370B, 370C or 370D. As discussed herein, in some examples, applications with multiple individual application sub-elements, such as separate windows or documents, may have an alternative input mapping provided for them, in which case application input mode states data 356 will include input mode state data for specific application sub-elements.

Figure 5A:
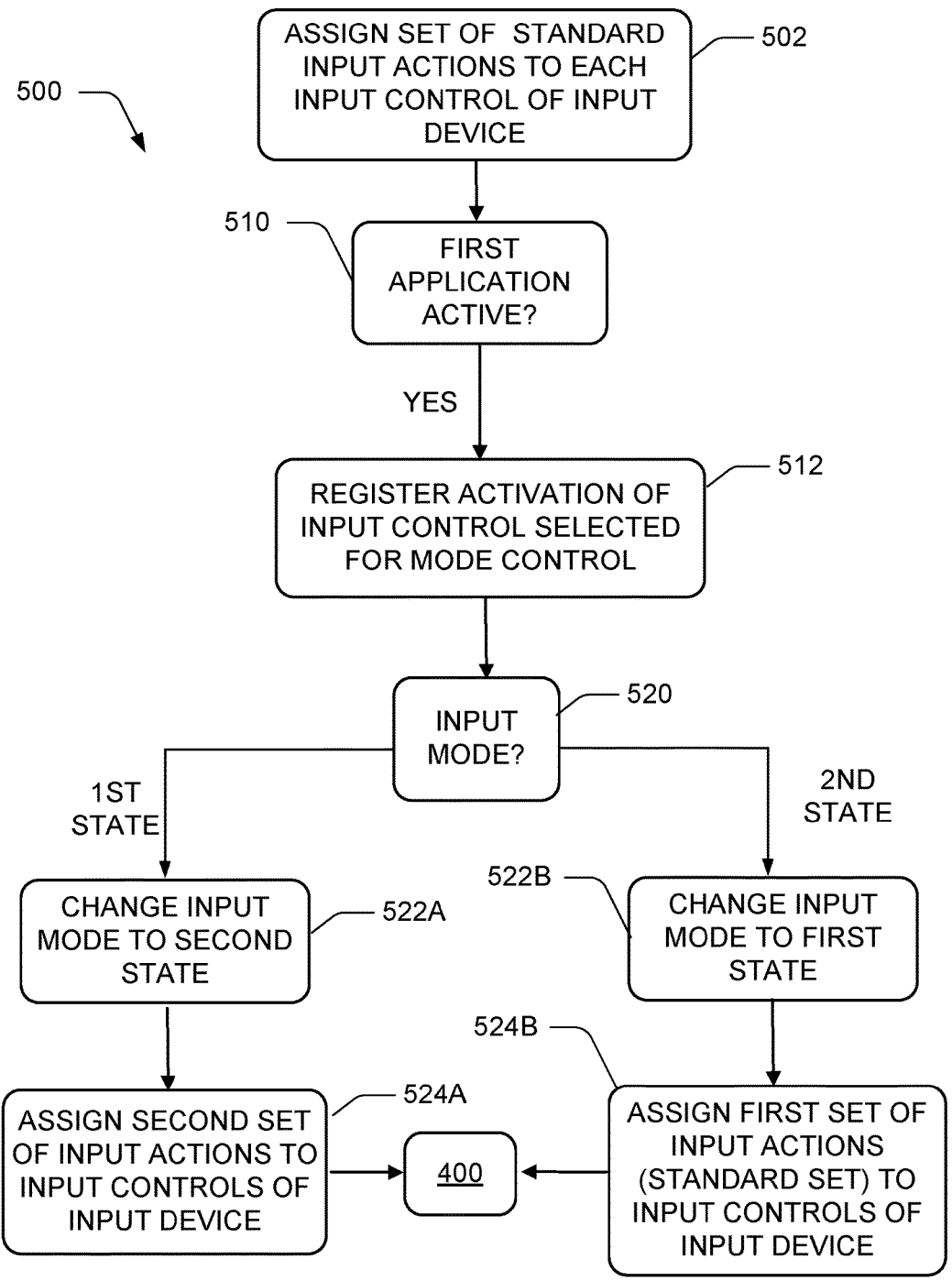
FIGS. 5A and 5B are flow diagrams showing illustrative examples of routines disclosed herein for application specific adaptations of user input assignments for an input device.
Figure 5B:
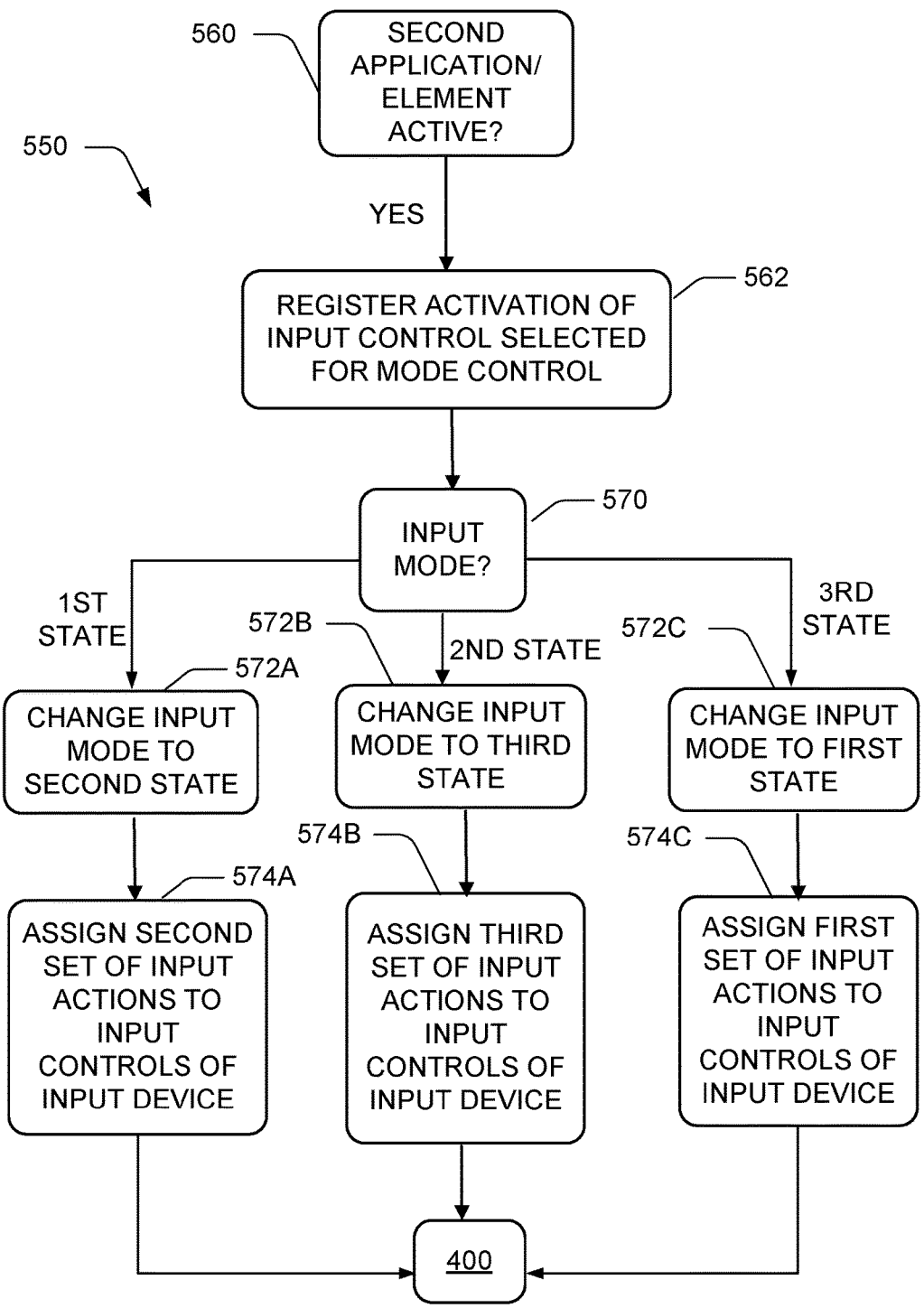

FIGS. 5A and 5B are flow diagrams illustrating simplified examples of processes initiated by OS 352 in computing device 250 to manage input mode states for specific applications or application sub-elements in accordance with the present approach. In the example of FIG. 5A, routine 500 permits an input mode state for an application to be toggled between a standard device input mapping 354 and an alternate input mapping, e.g. alternate input mapping 370A. At 502, for a standard input mode state, OS 352 will initially assign each of a set of standard input actions to each input control of the user input device, such as the game controller 200.

At 510, when a first application is active, e.g. application 360A, OS 352 monitors, at 512, a control input, e.g. an X command input of the game controller, selected as the input mode state control for the application. If the input mode state control is activated, then OS 352 obtains the current input mode state for the first application from application input mode state data 356 and control branches at 520 based on the current input mode state. If the input mode state is a first state, e.g. standard input mapping state, then the input mode state is changed to a second input mode state at 522A and a second set of input actions, e.g. alternate input mapping 370A, is assigned to the input controls of the input device. Input control actions on the input device are then translated or interpreted in the routine 400 or 450 in accordance with the second set of input actions, e.g. alternate input mapping 370A.

If the input mode state is the second state, e.g. the alternate input mapping 370A is currently selected for use with application 360A, then the input mode state is changed back to the first state at 522B and the first set of input actions, e.g. the standard input mapping 354, is restored, at 524B, for the input controls of the input device. Input control actions on the input device are once again translated or interpreted in the routine 400 or 450 in accordance with the first set of input actions, e.g. standard input mapping 354. Thus, routine 500 can return to any one of the operation blocks of routine 400 or 450.

As noted with respect to application 360B in FIG. 3, multiple alternate input mappings may be provided for applications.

FIG. 5B illustrates an example of a routine 550 that provides for the selection of multiple input mappings. At 560, if a second application or sub-element of an application is active, e.g. application 360B or a window of application 360B, then OS 352 monitors, at 562, a control input, e.g. an X command input of the game controller, selected as the input mode state control for the application. If the input mode state control input is activated, then OS 352 obtains the current input mode state for the second application from application input mode state data 356 and control branches at 570 based on the current input mode state. If the input mode state is a first state, e.g. standard input mapping state, then the input mode state is changed to a second input mode state at 572A and a second set of input actions, e.g. alternate input mapping 370B, is assigned to the input controls of the input device at 574A. Input control actions on the input device are then translated or interpreted in routine 400 or 450 in accordance with the second set of input actions, e.g. alternate input mapping 370B.

Similarly, if the current input mode state of the second application is the second state, then the state is changed to a third state, at 572B, and a third set of input actions is assigned to the input controls of the input device at 574B. If the current input mode state of the second application is the third state, then the state, in this example, is returned to the first state, at 572C, and the first set of input control actions is assigned to the input controls of the input device at 574C. The resulting operation of routine 550 is to rotate through a first, a second and a third input state, in that order. After each of 574A, 574B, or 574C, routine 550 can return to any one of the blocks of routine 400 or 450. One of ordinary skill in the art will recognize that a wide variety of approaches involving multiple input control states and alternate input mappings may exist without departing from the techniques shown herein. A system or method in accordance with the present approach can be designed to utilize as many alternate input mappings as are desired.

Figure 6:
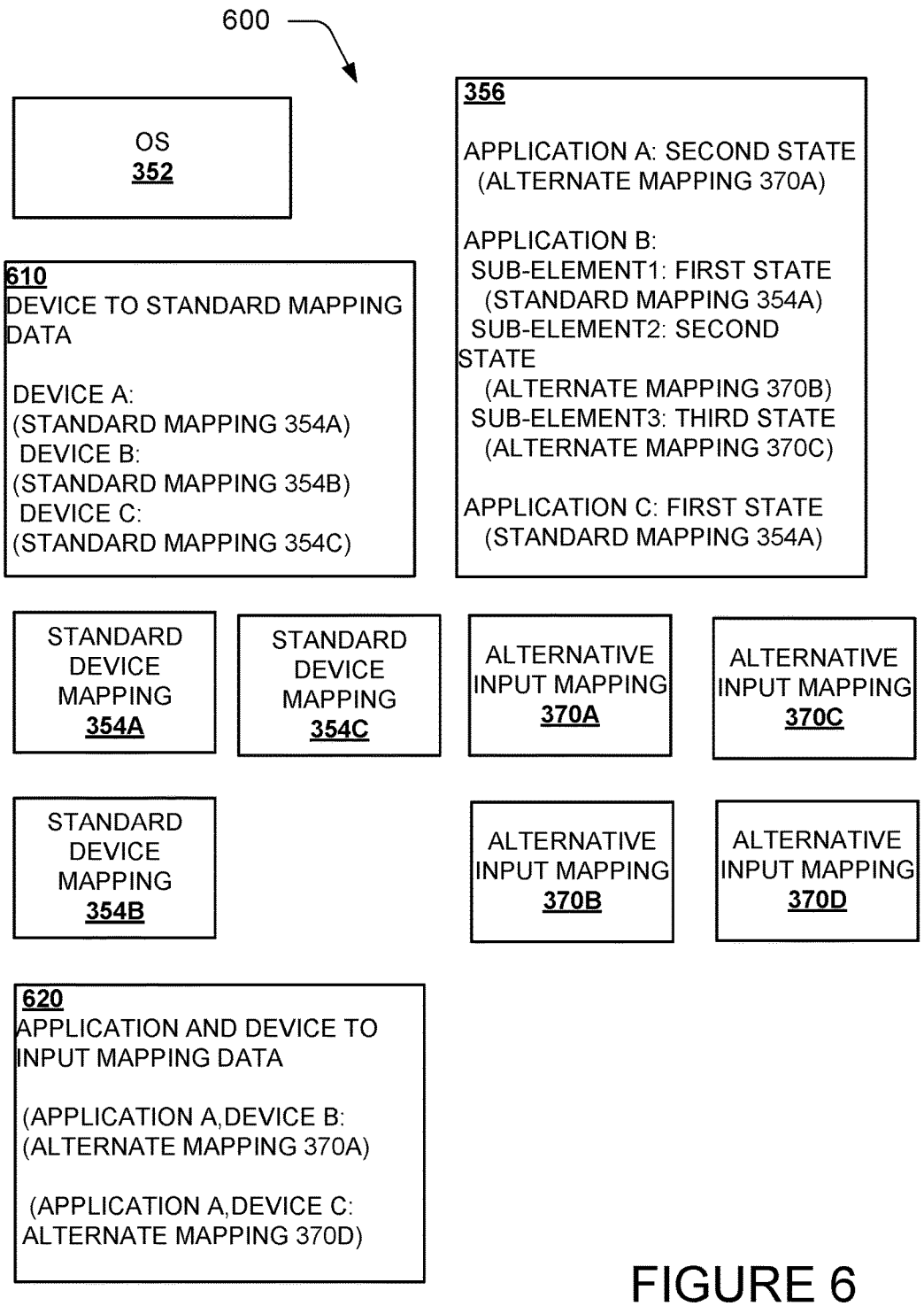
FIG. 6 is a block diagram showing an illustrative software architecture associated with the examples of FIGS. 5A and 5B.

FIG. 6 is a block diagram showing an illustrative software architecture 600 associated with the examples of FIGS. 5A and 5B in accordance with the approach described herein along with some additional possible features. In the example of FIG. 6, OS 352 has access to data 610 that identifies a particular standard mapping set for multiple different types of user input devices, such as standard mapping 354A for device type A, standard mapping 354B for device type B, and standard mapping 354C for device type C. OS 352 has access to standard device mappings 354A, 354B and 354C. OS 352 can be configured to recognize the type of user input device that is in communication with the computer device 250, determine the corresponding standard mapping for the type of user input device from 610, and assign the appropriate first set of input actions, e.g. standard device mapping 354A 354B or 354C, to be initially assigned to the input controls of the input device.

Figure 7A:
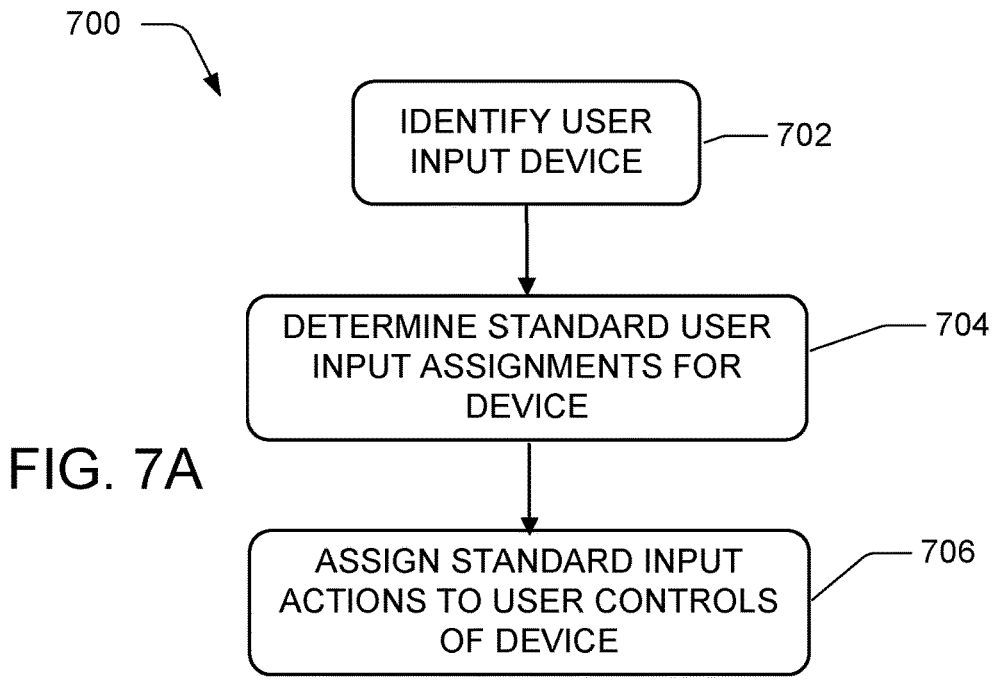
FIGS. 7A, 7B and 7C are flow diagrams showing other illustrative examples of routines disclosed herein for application specific adaptation of user input assignments for an input device.

FIG. 7A is a flow diagram illustrating an example of a process 700 for loading a standard input assignment based on a device. At 702, the user input device is identified. At 704, the device to standard mapping data 610 is referenced by OS 352 to determine which standard user input mapping is appropriate for the identified device. At 706, the standard input actions of the standard user input mapping are assigned to the input actions of the identified device. This process is the same or similar to conventional processes for discovering and initializing user input devices.

Returning to FIG. 6, architecture 600 also shows an illustrative example of input mode state data 356, such as might result from the selection of alternate mappings in FIGS. 5A and 5B. Input mode state data 356 includes state data for application A, e.g. application 360A, indicating that the application is in its second input mode state and indicating the alternate input mapping corresponding to the second state, e.g. alternate mapping 370A.

The example data shown for application B, e.g. application 360B, shows input mode state data being maintained for individual sub-elements, such as separate windows or documents of the application. In the example of FIG. 6, a first sub-element of application B is in a first state, which corresponds to standard mapping 354A, a second sub-element of application B is in a second state, which corresponds to alternate mapping 370B, and a third sub-element of application B is in a third state, which corresponds to alternate mapping 370C.

Figure 7B:
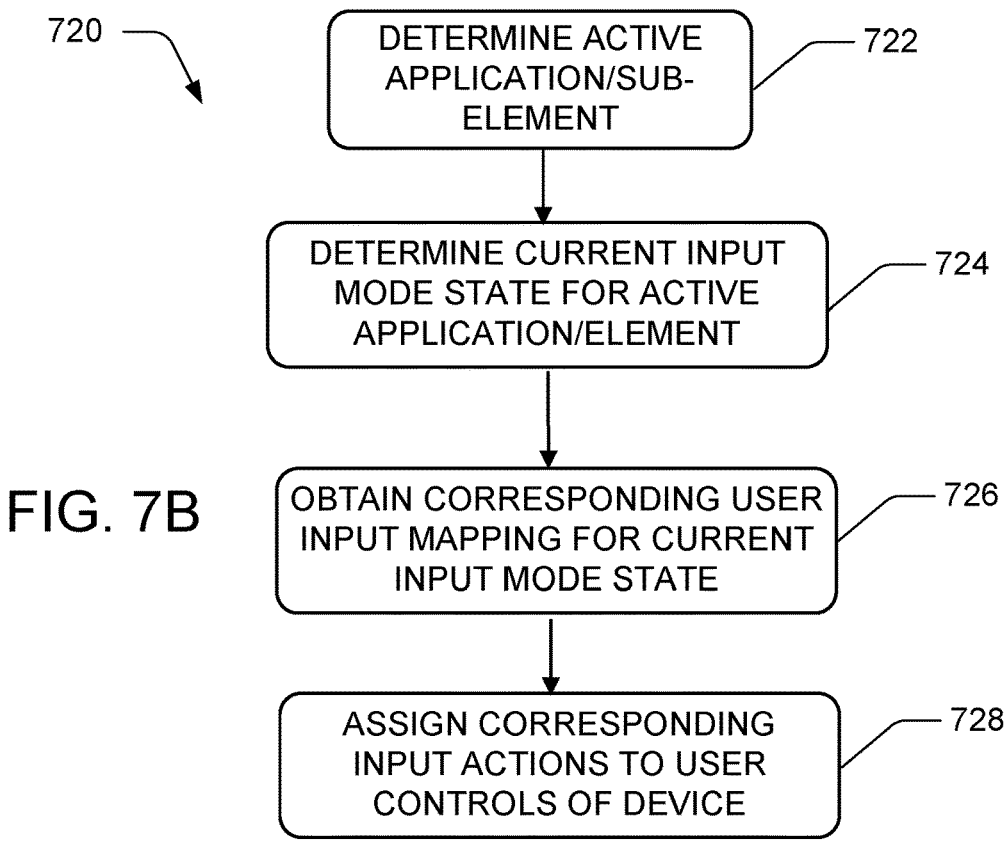

FIG. 7B illustrates an example of a process 720 for loading an input mapping for an application or application sub-element when such is activated. At 722, OS 352 determines the active application or sub-element that is currently active. At 724, the application input mode states data 356 is accessed to determine the current input mode state for the activated application or sub-element and, at 726, to identify and obtain the corresponding user input mapping for the input mode state. At 728, the input actions of the corresponding user input mapping are assigned to the input controls of the user input device.

In one illustrative scenario based on the data for application B, as an on-screen cursor is moved and sub-element 1 of application B, which is an open window, is selected to activate it, OS 352 loads standard input mapping 354A and the user input controls are processed in accordance with standard input mapping 354A by the routine 400 or routine 450. When the cursor is moved to select sub-element 2 of application B, which is another open window, OS 352 loads alternate input mapping 370B and the user input controls are processed in accordance with alternate input mapping 370B. When the cursor is moved to select sub-element 3 of application B, which is an icon, OS 352 loads alternate input mapping 370C and the user input controls are processed in accordance with alternate input mapping 370C. Thus, each of the three sub-elements of application B has its own user input mapping, which is loaded when the sub-element is activated for user input.

Returning to FIG. 6, in some examples relating to another aspect of the present approach, application and device to input mapping data 620 can be provided, which includes entries mapping a particular application and device combination to a user input mapping. This aspect permits an alternate mapping to be identified for a particular application when it is used on a particular user input device, e.g. a mapping application used with a game controller.

Figure 7C:
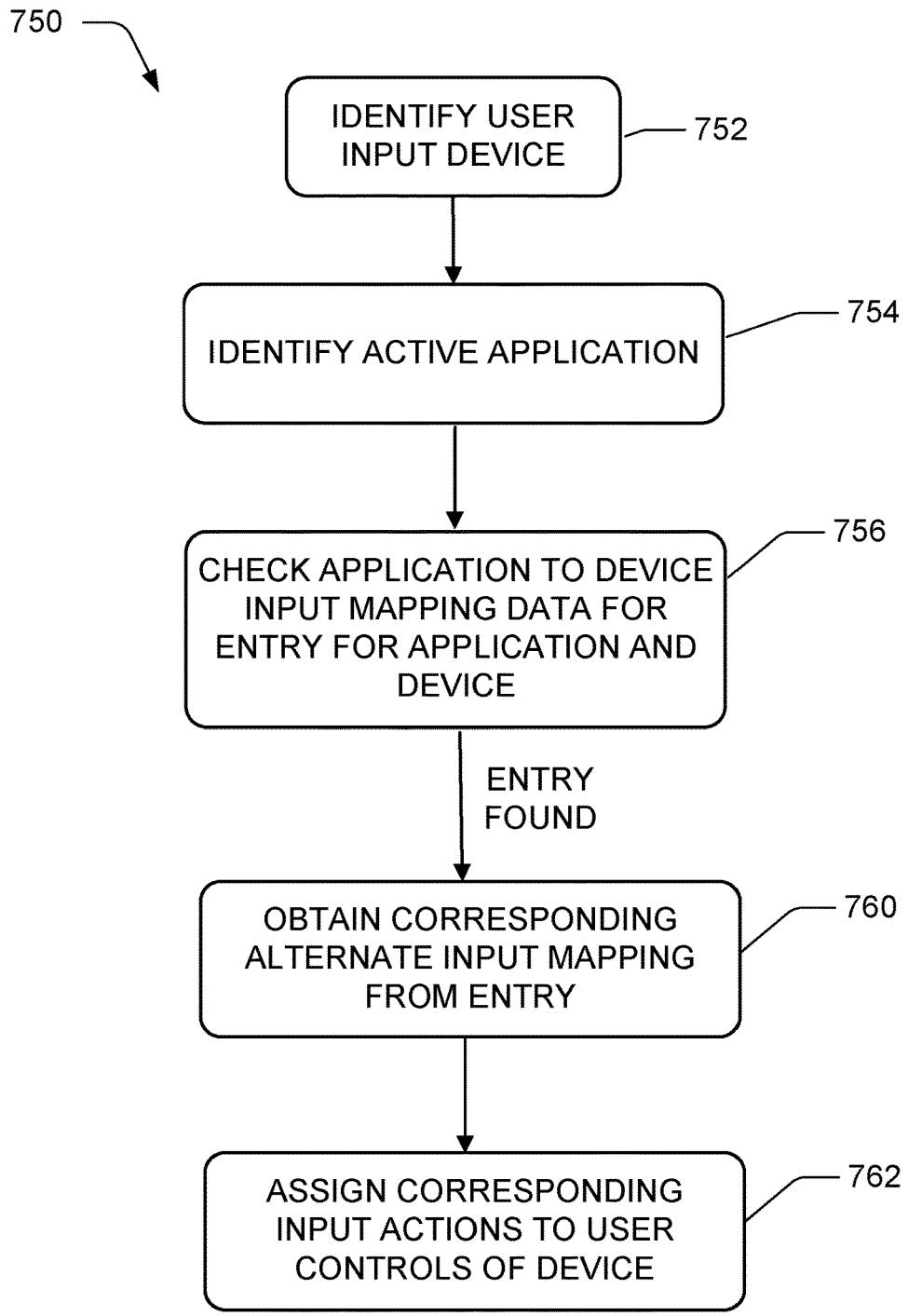

FIG. 7C is a flow diagram showing an illustrative example of a process 750 that can load an alternate mapping for certain application and device combinations based on the application and device to input mapping data 620. At 752, OS 352 identifies the user input device and, at 754, identifies the activate application. At 756, OS 352 accesses application and device to input mapping data 620 to determine if an entry exists for the application and device combination. If an entry is found, then, at 760, the alternate input mapping from the entry is obtained and, at 762, the input actions of the alternate input mapping from the entry are assigned to the input controls of the user input device.

In one illustrative scenario, process 750 is utilized to assign alternate input mappings when an application is utilized with a particular user input device. Using the data for application A in application and device to input mapping data 620, if user input device type B is utilized with application A, then alternate mapping 370A is loaded to translate or interpret the user control signals of the input device. Similarly, if user input device type C is utilized with application A, then alternate mapping 370D is loaded to translate or interpret the user control signals of the input device.

The present approach allows alternate mappings 370 to be defined for applications 360 that adapt the user controls of the user input device 200 for use with the application. In some examples, the alternate mappings may be defined by a developer of the application to tailor the user controls of the device to the application. In other examples, end users may define the alternate mappings that they desire. One of ordinary skill in the art will recognize that a wide variety of approaches may be utilized and combined with the present approach involving application specific adaption of user input assignments for input devices. The specific examples of different aspects of assigning alternate input mappings to the input controls of a user input device described herein are illustrative and are not intended to limit the scope of the techniques shown.

Figure 9:
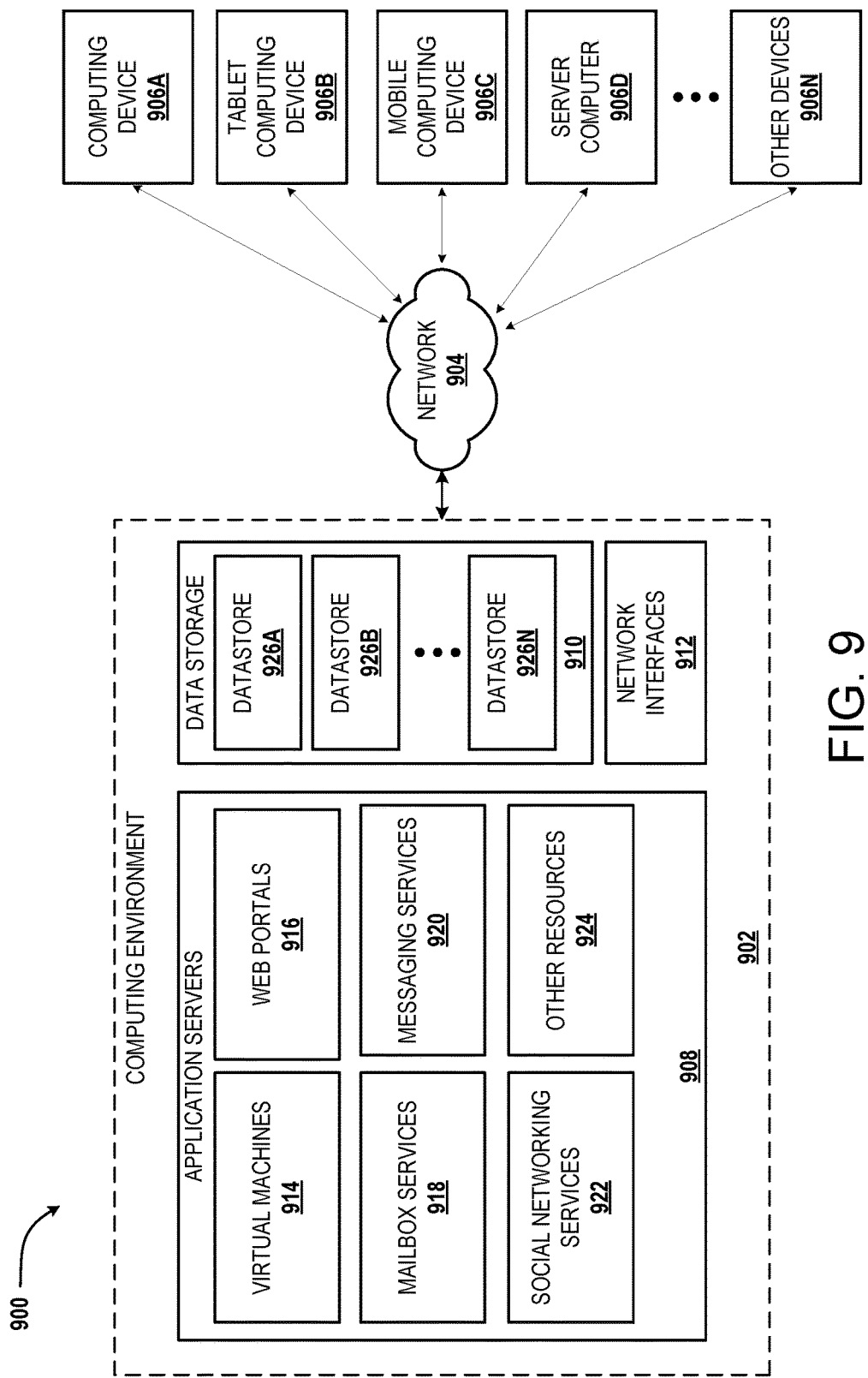
FIG. 9 is a diagram illustrating a distributed computing environment capable of implementing aspects of the techniques and technologies presented herein.

Note that at least parts of processes 500, 550, 700, 720 and 750, and other processes described herein may be implemented in a server, such as computer environment 902 in FIG. 9, or the cloud, and data defining the results of the user controls signals translated or interpreted as discussed herein may be communicated to a user device for display. Alternatively, the alternate input control adaptation processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (400, 450, 500, 550, 700, 720, and 750) are described herein as being implemented, at least in part, by an application, component, and/or circuit. Although the following illustration refers to the components of FIGS. 2, 8, 9 and 10, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programming interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of FIGS. 2, 8, 9 and 10, it can be appreciated that the operations of the routines (400, 450, 500, 550, 700, 720, and 750) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 8:
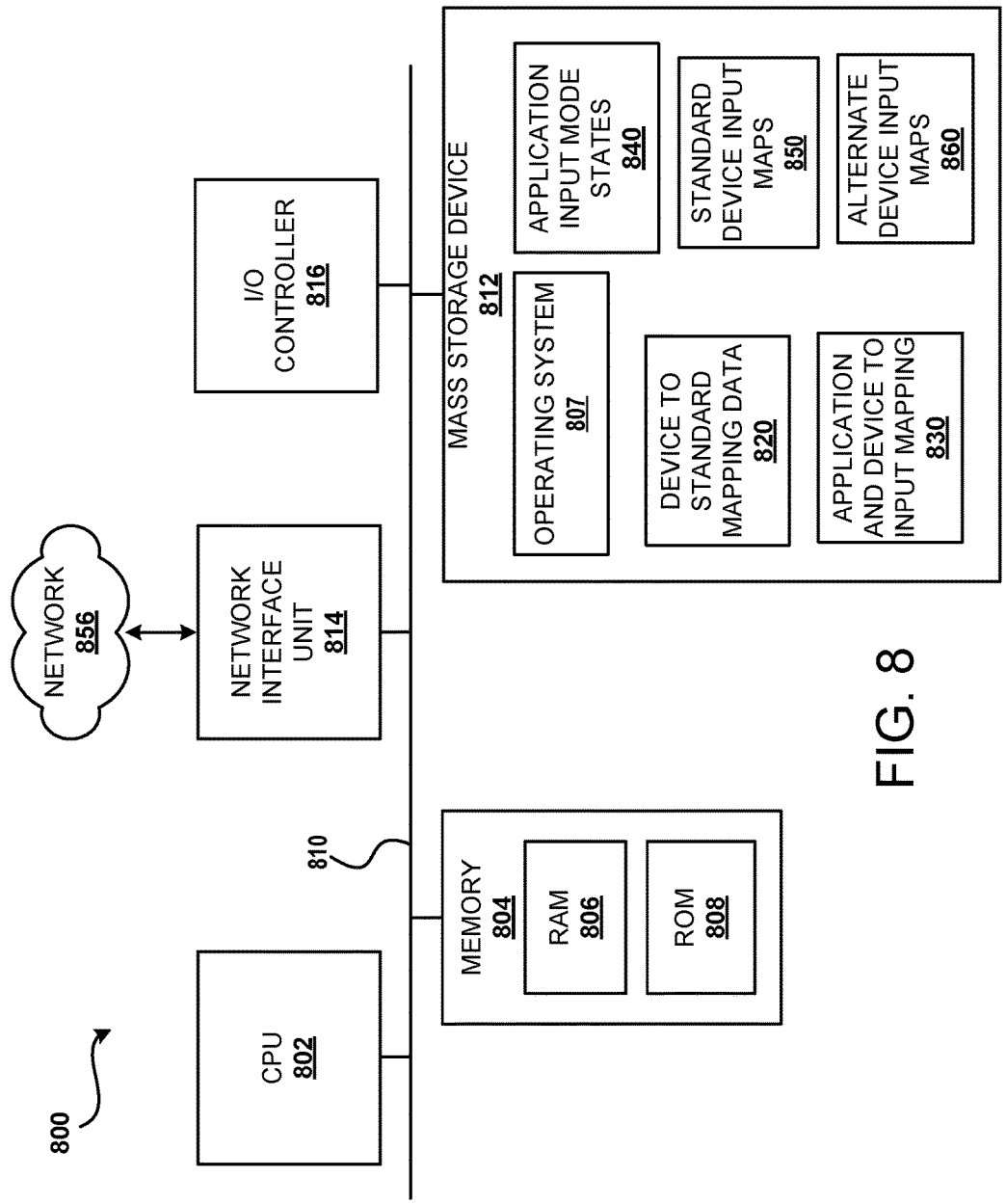
FIG. 8 is a computer architecture diagram illustrating an illustrative computer hardware and software architecture for a computing system capable of implementing aspects of the techniques and technologies presented herein.

FIG. 6 shows additional details of an example computer architecture 800 for a computer, such as the computing device 250 (FIG. 2), capable of executing the program components described herein. Thus, the computer architecture 800 illustrated in FIG. 8 illustrates an architecture for a server computer, mobile phone, a PDA, a smart phone, a desktop computer, a netbook computer, a tablet computer, an on-board computer, a game console, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between sub-elements within the computer architecture 800, such as during startup, is stored in the ROM 808. The computer architecture 800 further includes a mass storage device 812 for storing an operating system 807, data, such as device to standard mapping data 820, application and device to input mapping 830, application input mode states 840, standard device input maps 850, alternate device input maps 860, and one or more application programs.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data.

For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown). The computer architecture 800 may connect to the network 856 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, game controller, television remote or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

FIG. 9 depicts an illustrative distributed computing environment 900 capable of executing the software components described herein for adapting input action assignments for input controls of an input device. Thus, the distributed computing environment 900 illustrated in FIG. 9 can be utilized to execute any aspects of the software components presented herein. For example, the distributed computing environment 900 can be utilized to execute aspects of the software components described herein.

According to various implementations, the distributed computing environment 900 includes a computing environment 902 operating on, in communication with, or as part of the network 904. The network 904 may be or may include the network 856, described above. The network 904 also can include various access networks. One or more client devices 906A-706N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, an on-board computer, or other mobile computing device; a server computer 906D; and/or other devices 906N, which can include user input devices, such as game controllers and television remotes. It should be understood that any number of devices 906 can communicate with the computing environment 902. Two example computing architectures for the devices 906 are illustrated and described herein with reference to FIGS. 8 and 9. It should be understood that the illustrated devices 906 and computing architectures illustrated and described herein are illustrative only, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for adapting input action assignments for input controls of an input device. It should be understood that this configuration is illustrative only, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for adapting input action assignments for input controls of an input device. For instance, any one of the application servers 908 may communicate or facilitate the functionality and features described herein. For instance, a social networking application, mail client, messaging client or a browser running on a mobile telephone or any other client 906 may communicate with a networking service 922 and facilitate the functionality, even in part, described above with respect to FIG. 9.

As shown in FIG. 9, the application servers 908 also can host other services, applications, portals, and/or other resources ("other resources") 924. The other resources 924 can include, but are not limited to, document sharing, rendering, or any other functionality. It thus can be appreciated that the computing environment 902 can provide integration of the concepts and technologies disclosed herein with various mailbox, messaging, social networking, and/or other services or resources.

As mentioned above, the computing environment 902 can include data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual data stores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients using devices 906. It should be understood that the devices 906 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 900 to utilize the functionality described herein for adapting input action assignments for input controls of an input device, among other aspects.

Figure 10:
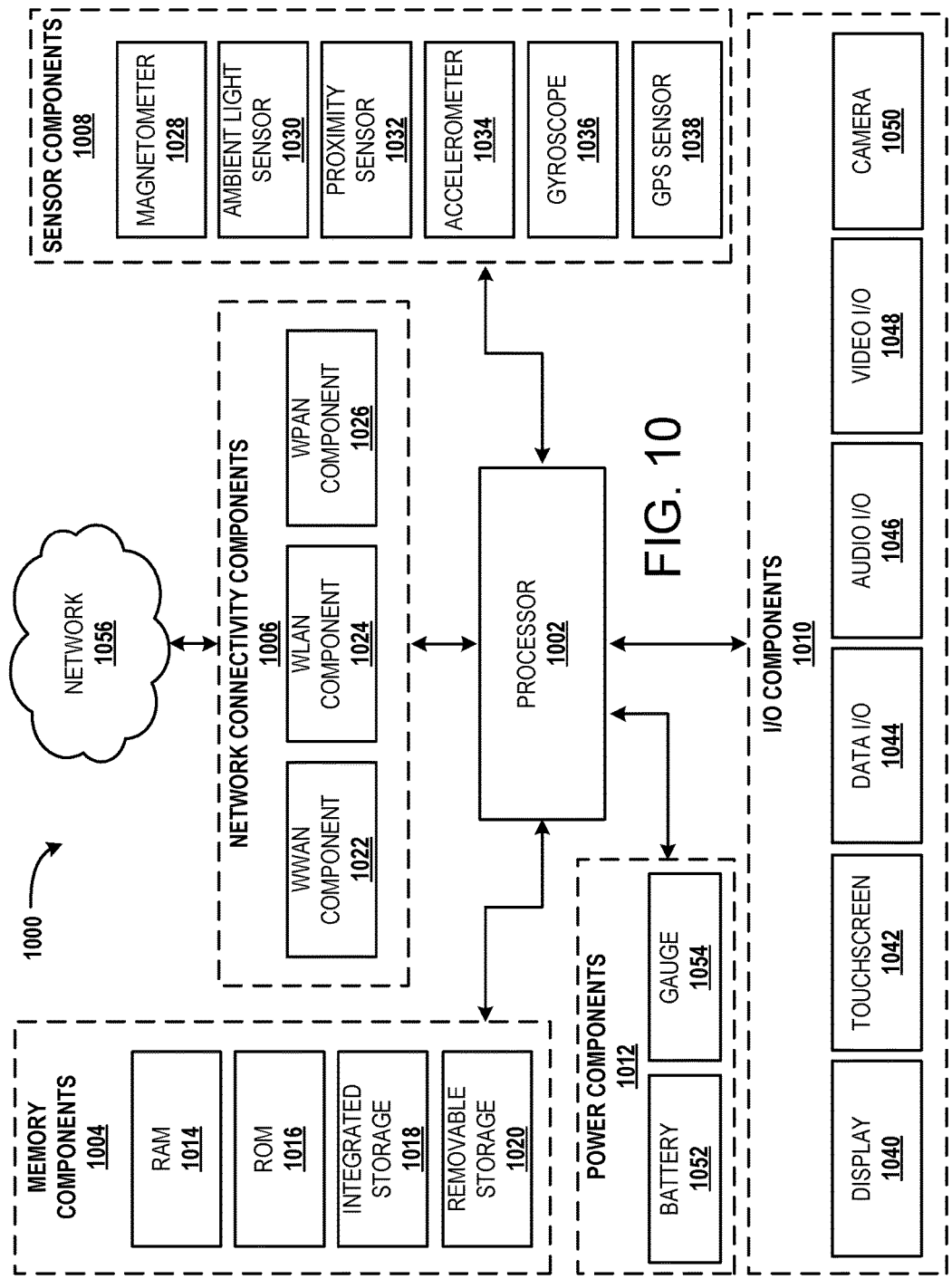
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components is described herein for adapting input action assignments for input controls of an input device. The computing device architecture 1000 is applicable to computing devices that facilitate mobile computing due, in part, to form factor, wireless connectivity, and/or battery-powered operation. In some configurations, the computing devices include, but are not limited to, mobile telephones, on-board computers, tablet devices, slate devices, portable video game devices, and the like. The computing device architecture 1000 is applicable to the computing device 250 shown in FIG. 2 and any of the clients 906 shown in FIG. 9. Moreover, aspects of the computing device architecture 1000 may be applicable to traditional desktop computers, portable computers (e.g., laptops, notebooks, ultra-portables, and netbooks), server computers, game consoles, and other computer systems, such as described herein with reference to FIG. 9. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individual components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 920P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination of the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 856 of FIG. 8. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1056 may be configured to provide voice and/or data communications with any combination of the above technologies. The network 1056 may be configured to or be adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 1002.11 standards, such as IEEE 1002.11a, 1002.11b, 1002.11g, 1002.11n, and/or future 1002.11 standard (referred to herein collectively as WI-FI). Draft 1002.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited to, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one of the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. In still other configurations, an application program utilizes output from the gyroscope 1036 and the accelerometer 1034 for game control. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interfaces described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative only and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1042. As such, the above gestures should be understood as being illustrative only and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspects of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature.

In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1

A computer-implemented method for adapting input action assignments for input controls of an input device, the method comprising: assigning (502) one of a first plurality of input actions (354) to each one of the plurality of input controls (204, 206, 210) of the input device (200); when a first application (360A) is active, registering a first input action of the first plurality of input actions from activation of one of the input controls (512) selected for mode control; responsive to registering the first input action from activation of the mode control when the first application is active: when an input mode of the first application is a first state: change the input mode (522A) of the first application to a second state, and assign (524A) a second plurality of input actions (370A) to each one of at least a first subset of the input controls; when the first application is active and the input mode of the first application is the second state, registering (400) a first input action according to the second plurality of input actions from activation of a first one of the first subset of the input controls; and when a second application is active, registering (400) a second input action in accordance with the first plurality of input actions from activation of the first one of the first subset of the input controls.

Example 2

The method of claim 1, wherein: the first application includes at least a first sub-element; when the first sub-element of the first application is active, registering a third input action from activation of the mode control when the first sub-element of the first application is active and, responsive thereto: when the first sub-element of the first application is active and an input mode of the first sub-element is a first state: change an input mode of the first sub-element of the first application to a second state, and assign a third plurality of input actions to each one of at least a second subset of the plurality of input controls; when the first sub-element of the first application is active and the input mode is the second state, registering a first input action of the third plurality of input actions from activation of a first one of the second subset of the plurality of input controls; and when a second sub-element of the first application is active, registering a second input action of the second plurality of input actions from activation of the first one of the second subset of the plurality of input controls.

Example 3

The method of claim 2, wherein the sub-elements of the first application include one or more of windows, documents, and split screens.

Example 4

The method of claim 1, the method further including: storing the input mode of the first application; responsive to activation of the second application, assigning the first plurality of input actions to the plurality of input controls; and responsive to activation of the first application: obtain the input mode of the first application, and when the input mode of the first application is the second state, assigning the second plurality of input actions to each one of the first subset of the plurality of input controls.

Example 5

The method of claim 1, the method further including: when the first application is active and the input mode of the first application is the second state, registering activation of the mode control and, responsive thereto, when the input mode of the first application is the second state: change the input mode of the first application to the first state, and assign the first plurality of input actions to the plurality of input controls.

Example 6

The method of claim 1, wherein: when the first application is active, registering activation of the mode control and, responsive thereto: when the input mode of the first application is the second state: change the input mode of the first application to a third state, and assign a third plurality of input actions to each one of at least a second subset of the plurality of input controls; and when the input mode of the first application is the third state, registering a first input action in accordance with the third plurality of input actions from activation of a first one of the second subset of the plurality of input controls.

Example 7

The method of claim 1, wherein: the first application includes a plurality of sub-elements; when a first sub-element of the first application is active, registering activation of the first one of the plurality of input controls of the input device with an input mode of the first sub-element of the first application being a first state; responsive to registering activation of the first one of the plurality of input controls when the first sub-element of the first application is active: change the input mode of the first sub-element of the first application to a second state, and assign a third plurality of input actions to each one of at least a second subset of the plurality of input controls; when the first sub-element of the first application is active with the input mode of the first sub-element of the first application being the second state, registering a first input action of the third plurality of input actions from activation of a first one of the second subset of the plurality of input controls; and when a second sub-element of the first application is active, registering a second input action of the second plurality of input actions from activation of the first one of the second subset of the plurality of input controls.

Example 8

The method of claim 7, wherein: when the first sub-element of the first application is active, registering activation of the first one of the plurality of input controls of the input device with the input mode of the first sub-element of the first application being the second state; responsive to registering activation of the first one of the plurality of input controls when the first sub-element of the first application is active with the input mode of the first sub-element of the first application being the second state: change the input mode of the first sub-element of the first application to a third state, and assign a fourth plurality of input actions to each one of at least a third subset of the plurality of input controls; when the first sub-element of the first application is active with the input mode of the first sub-element of the first application being the third state, registering a first input action of the fourth plurality of input actions from activation of a first one of the third subset of the plurality of input controls; and when a second sub-element of the first application is active, registering a second input action of the second plurality of input actions from activation of the first one of the fourth subset of the plurality of input controls.

Example 9

The method of claim 1, the method further including: detecting a type of the input device; identifying a default plurality of input actions corresponding to the detected type; responsive to identifying the default plurality of input actions: change the input mode of the first application to a default state, and assign the default plurality of input actions to each one of at least a second subset of the plurality of input controls.

Example 10

A method for assigning alternate input action assignments for input controls of an input device that are application specific, the method comprising: identifying (752) a type of the input device; checking for a data entry (610) that identifies a standard mapping (354) corresponding to the type of the input device and assigning (502) input actions of the standard mapping to the input controls (204, 206, 210) of the input device (200); identifying (754) a first application that is active; checking (756) for a data entry (620) that maps a combination of the identified first application and the identified type of the input device to a corresponding alternate input mapping (370); when an entry is found for the identified first application and the identified type of the input device, obtaining (760) the corresponding alternate input mapping (370); when the first application is active, assigning (762) each input action of the corresponding alternate input mapping to one of the input controls (204, 206, 210) of the input device (200); when the first application is active, registering (400) an input action according to the corresponding alternate input mapping from activation of one of the input controls of the input device; and when a second application is active, registering (400) an input action according to the standard mapping from activation of one of the input controls of the input device.

Example 11

The method of claim 10, the method further including: when the first application (360A) is active, registering a first mode control input action from activation of one of the input controls (512) selected for mode control; responsive to registering the first mode control input action when the first application is active: when an input mode of the first application is a first state: change the input mode (522A) of the first application to a second state, and assign (524A) another alternate input mapping (370) to at least a first subset of the input controls; and when the first application is active and the input mode of the first application is the second state, registering (400) a first input action according to the another alternate mapping from activation of one of the first subset of the input controls.

Example 12

The method of claim 11, the method further including: when the first application is active and the input mode of the first application is the second state, registering activation of the mode control and, responsive thereto: change the input mode of the first application to the first state, and assign each input action of the corresponding alternate input mapping to one of the input controls of the input device.

Example 13

The method of claim 11, the method further including: storing the input mode of the first application; responsive to activation of the first application: obtain the input mode of the first application, and when the input mode of the first application is the first state, assign each input action of the corresponding alternate input mapping to one of the input controls of the input device, and when the input mode of the first application is the second state, assigning the another input mapping to each one of the first subset of the plurality of input controls.

Example 14

The method of claim 10, the method further including: a third application that includes multiple sub-elements; when a first sub-element of the third application is active, registering a second input action from activation of the mode control and, responsive thereto: when the first sub-element of the third application is active and an input mode of the first sub-element is a first state: change an input mode of the first sub-element of the third application to a second state, and assign each input action of another alternate input mapping to one of the input controls of the input device; when the first sub-element of the third application is active and the input mode is the second state, registering an input action of the another alternate input mapping from activation of one of the input controls of the input device; and when a second sub-element of the third application is active, registering an input action of the standard mapping from activation of one of the input controls of the input device.

Example 15

The method of claim 14, wherein: when a first sub-element of the third application is active, registering a third input action from activation of the mode control and, responsive thereto: when the first sub-element of the third application is active and an input mode of the first sub-element is the second state: change an input mode of the first sub-element of the third application to a third state, and assign each input action of yet another alternate input mapping to one of the input controls of the input device; and when the first sub-element of the third application is active and the input mode is the third state, registering an input action of the yet another alternate input mapping from activation of one of the input controls of the input device.

Example 16

The method of claim 15, the method further including: storing the input mode of the first, second and third sub-elements of the third application; responsive to activation of the first sub-element of the third application: obtain the input mode of the first sub-element of the third application, and when the input mode of the first sub-element of the third application is the first state, assign each input action of the corresponding alternate input mapping to one of the input controls of the input device; when the input mode of the first sub-element of the third application is the second state, assign each input action of the another alternate input mapping to one of the input controls of the input device; when the input mode of the first sub-element of the third application is the third state, assign each input action of the yet another alternate input mapping to one of the input controls of the input device.

Example 17

A system (800), the system (800) comprising: a processor (802); a display; and a memory (804) in communication with the processor (802), the memory (802) having computer-readable instructions stored thereupon that, when executed by the processor (802), cause the processor (802) to perform a method comprising: assigning (502) one of a first plurality of input actions (354) to each one of the plurality of input controls (204, 206, 210) of the input device (200); registering a first input action of the first plurality of input actions from activation of one of the input controls (512) selected for mode control; responsive to registering the first input action from activation of the mode control: when an input mode of the first application is a first state: change the input mode (522A) of the first application to a second state, and assign (524A) a second plurality of input actions (370A) to each one of at least a first subset of the input controls; when the input mode of the first application is the second state, registering (400) a first input action according to the second plurality of input actions from activation of a first one of the first subset of the input controls; and registering (400) a second input action in accordance with the first plurality of input actions from activation of the first one of the first subset of the input controls.

Example 18

The system of claim 17, wherein the first application includes at least a first sub-element and the memory further includes instructions stored thereupon that, when executed by the processor, cause the processor to: register a third input action from activation of the mode control for the first sub-element of the first application and, responsive thereto: when an input mode of the first sub-element is a first state: change the input mode of the first sub-element of the first application to a second state, and assign a third plurality of input actions to each one of at least a second subset of the plurality of input controls; when the input mode of the first sub-element of the first application is the second state, register a first input action of the third plurality of input actions from activation of a first one of the second subset of the plurality of input controls; and for a second sub-element of the first application, register a second input action of the second plurality of input actions from activation of the first one of the second subset of the plurality of input controls.

Example 19

The system of claim 18, wherein the sub-elements of the first application include one or more of windows, documents, and split screens.

Example 20

The system of claim 17 where the memory further includes instructions stored thereupon that, when executed by the processor, cause the processor to: store the input mode of the first application; assign the first plurality of input actions to the plurality of input controls for the second application; and for the first application: obtain the input mode of the first application, and when the input mode of the first application is the second state, assign the second plurality of input actions to each one of the first subset of the plurality of input controls.

Example 21

The system of claim 17, where the memory further includes instructions stored thereupon that, when executed by the processor, cause the processor to: when the input mode of the first application is the second state, register activation of the mode control and, responsive thereto, when the input mode of the first application is the second state: change the input mode of the first application to the first state, and assign the first plurality of input actions to the plurality of input controls.

Example 22

The system of claim 17, where the memory further includes instructions stored thereupon that, when executed by the processor, cause the processor to: register activation of the mode control for the first application and, responsive thereto: when the input mode of the first application is the second state: change the input mode of the first application to a third state, and assign a third plurality of input actions to each one of at least a second subset of the plurality of input controls; and when the input mode of the first application is the third state, register a first input action in accordance with the third plurality of input actions from activation of a first one of the second subset of the plurality of input controls.

Example 23

The system of claim 17, where the first application includes a plurality of sub-elements and the memory further includes instructions stored thereupon that, when executed by the processor, cause the processor to: register activation of the first one of the plurality of input controls of the input device for a first sub-element of the first application with an input mode of the first sub-element of the first application being a first state; responsive to registering activation of the first one of the plurality of input controls for the first sub-element of the first application: change the input mode of the first sub-element of the first application to a second state, and assign a third plurality of input actions to each one of at least a second subset of the plurality of input controls; when the input mode of the first sub-element of the first application is the second state, register a first input action of the third plurality of input actions for the first sub-element of the first application from activation of a first one of the second subset of the plurality of input controls; and register a second input action of the second plurality of input actions a second sub-element of the first application from activation of the first one of the second subset of the plurality of input controls.

Example 24

The system of claim 23, where the memory further includes instructions stored thereupon that, when executed by the processor, cause the processor to: register activation of the first one of the plurality of input controls of the input device the first sub-element of the first application when the input mode of the first sub-element of the first application is the second state; responsive to registering activation of the first one of the plurality of input controls when the input mode of the first sub-element of the first application is the second state: change the input mode of the first sub-element of the first application to a third state, and assign a fourth plurality of input actions to each one of at least a third subset of the plurality of input controls; when the input mode of the first sub-element of the first application is the third state, register a first input action of the fourth plurality of input actions for the first sub-element of the first application from activation of a first one of the third subset of the plurality of input controls; and register a second input action of the second plurality of input actions for a second sub-element of the first application from activation of the first one of the fourth subset of the plurality of input controls.

Example 25

The system of claim 17, where the memory further includes instructions stored thereupon that, when executed by the processor, cause the processor to: detect a type of the input device; identify a default plurality of input actions corresponding to the detected type; responsive to identifying the default plurality of input actions: change the input mode of the first application to a default state, and assign the default plurality of input actions to each one of at least a second subset of the plurality of input controls.

Example 26

A system (800), the system (800) comprising: a processor (802); a display; and a memory (804) in communication with the processor (802), the memory (802) having computer-readable instructions stored thereupon that, when executed by the processor (802), cause the processor (802) to perform a method comprising: identifying (752) a type of the input device; checking for a data entry (610) that identifies a standard mapping (354) corresponding to the type of the input device and assigning (502) input actions of the standard mapping to the input controls (204, 206, 210) of the input device (200); identifying (754) a first application that is active; checking (756) for a data entry (620) that maps a combination of the identified first application and the identified type of the input device to a corresponding alternate input mapping (370); when an entry is found for the identified first application and the identified type of the input device, obtaining (760) the corresponding alternate input mapping (370); when the first application is active, assigning (762) each input action of the corresponding alternate input mapping to one of the input controls (204, 206, 210) of the input device (200); when the first application is active, registering (400) an input action according to the corresponding alternate input mapping from activation of one of the input controls of the input device; and when a second application is active, registering (400) an input action according to the standard mapping from activation of one of the input controls of the input device.

Example 27

The system of claim 26, where the memory further includes instructions stored thereupon that, when executed by the processor, cause the processor to: when the first application (360A) is active, register a first mode control input action from activation of one of the input controls (512) selected for mode control; responsive to registering the first mode control input action when the first application is active: when an input mode of the first application is a first state: change the input mode (522A) of the first application to a second state, and assign (524A) another alternate input mapping (370) to at least a first subset of the input controls; and when the first application is active and the input mode of the first application is the second state, register (400) a first input action according to the another alternate mapping from activation of one of the first subset of the input controls.

Example 28

The system of claim 27, where the memory further includes instructions stored thereupon that, when executed by the processor, cause the processor to: when the first application is active and the input mode of the first application is the second state, register activation of the mode control and, responsive thereto: change the input mode of the first application to the first state, and assign each input action of the corresponding alternate input mapping to one of the input controls of the input device.

Example 29

The system of claim 27, where the memory further includes instructions stored thereupon that, when executed by the processor, cause the processor to: store the input mode of the first application; responsive to activation of the first application: obtain the input mode of the first application, and when the input mode of the first application is the first state, assign each input action of the corresponding alternate input mapping to one of the input controls of the input device, and when the input mode of the first application is the second state, assign the another input mapping to each one of the first subset of the plurality of input controls.

Example 30

The system of claim 26, where the memory further includes instructions stored thereupon that, when executed by the processor, cause the processor to: identify a third application that is active, where the third application includes multiple sub-elements; when a first sub-element of the third application is active, registering a second input action from activation of the mode control and, responsive thereto: when the first sub-element of the third application is active and an input mode of the first sub-element is a first state: change an input mode of the first sub-element of the third application to a second state, and assign each input action of another alternate input mapping to one of the input controls of the input device; when the first sub-element of the third application is active and the input mode is the second state, registering an input action of the another alternate input mapping from activation of one of the input controls of the input device; and when a second sub-element of the third application is active, registering an input action of the standard mapping from activation of one of the input controls of the input device.

Example 31

The system of claim 30, where the memory further includes instructions stored thereupon that, when executed by the processor, cause the processor to: when a first sub-element of the third application is active, registering a third input action from activation of the mode control and, responsive thereto: when the first sub-element of the third application is active and an input mode of the first sub-element is the second state: change an input mode of the first sub-element of the third application to a third state, and assign each input action of yet another alternate input mapping to one of the input controls of the input device; and when the first sub-element of the third application is active and the input mode is the third state, registering an input action of the yet another alternate input mapping from activation of one of the input controls of the input device.

Example 32

The system of claim 31, where the memory further includes instructions stored thereupon that, when executed by the processor, cause the processor to: store the input mode of the first, second and third sub-elements of the third application; responsive to activation of the first sub-element of the third application: obtain the input mode of the first sub-element of the third application, and when the input mode of the first sub-element of the third application is the first state, assign each input action of the corresponding alternate input mapping to one of the input controls of the input device; when the input mode of the first sub-element of the third application is the second state, assign each input action of the another alternate input mapping to one of the input controls of the input device; when the input mode of the first sub-element of the third application is the third state, assign each input action of the yet another alternate input mapping to one of the input controls of the input device.

Example 33

A computer storage medium having computer executable instructions stored thereon which, when executed by one or more processors, cause the one or more processors to execute a method comprising: assigning (502) one of a first plurality of input actions (354) to each one of the plurality of input controls (204, 206, 210) of the input device (200); when a first application (360A) is active, registering a first input action of the first plurality of input actions from activation of one of the input controls (512) selected for mode control; responsive to registering the first input action from activation of the mode control when the first application is active: when an input mode of the first application is a first state: change the input mode (522A) of the first application to a second state, and assign (524A) a second plurality of input actions (370A) to each one of at least a first subset of the input controls; when the first application is active and the input mode of the first application is the second state, registering (400) a first input action according to the second plurality of input actions from activation of a first one of the first subset of the input controls; and when a second application is active, registering (400) a second input action in accordance with the first plurality of input actions from activation of the first one of the first subset of the input controls.

Example 34

The computer storage medium of claim 33, wherein the first application includes at least a first sub-element and the medium further includes instructions stored thereupon that, when executed by the one or more processors, cause the processors to: when the first sub-element of the first application is active, register a third input action from activation of the mode control when the first sub-element of the first application is active and, responsive thereto: when the first sub-element of the first application is active and an input mode of the first sub-element is a first state: change an input mode of the first sub-element of the first application to a second state, and assign a third plurality of input actions to each one of at least a second subset of the plurality of input controls; when the first sub-element of the first application is active and the input mode is the second state, register a first input action of the third plurality of input actions from activation of a first one of the second subset of the plurality of input controls; and when a second sub-element of the first application is active, register a second input action of the second plurality of input actions from activation of the first one of the second subset of the plurality of input controls.

Example 35

The computer storage medium of claim 34, wherein the sub-elements of the first application include one or more of windows, documents, and split screens.

Example 36

The computer storage medium of claim 34, where the medium further includes instructions stored thereupon that, when executed by the one or more processors, cause the processors to: store the input mode of the first application; responsive to activation of the second application, assign the first plurality of input actions to the plurality of input controls; and responsive to activation of the first application: obtain the input mode of the first application, and when the input mode of the first application is the second state, assign the second plurality of input actions to each one of the first subset of the plurality of input controls.

Example 37

The computer storage medium of claim 33, where the medium further includes instructions stored thereupon that, when executed by the one or more processors, cause the processors to: when the first application is active and the input mode of the first application is the second state, register activation of the mode control and, responsive thereto, when the input mode of the first application is the second state: change the input mode of the first application to the first state, and assign the first plurality of input actions to the plurality of input controls.

Example 38

The computer storage medium of claim 33, where the medium further includes instructions stored thereupon that, when executed by the one or more processors, cause the processors to: when the first application is active, register activation of the mode control and, responsive thereto: when the input mode of the first application is the second state: change the input mode of the first application to a third state, and assign a third plurality of input actions to each one of at least a second subset of the plurality of input controls; and when the input mode of the first application is the third state, register a first input action in accordance with the third plurality of input actions from activation of a first one of the second subset of the plurality of input controls.

Example 39

The computer storage medium of claim 33, where the first application includes a plurality of sub-elements and the medium further includes instructions stored thereupon that, when executed by the one or more processors, cause the processors to: when a first sub-element of the first application is active, register activation of the first one of the plurality of input controls of the input device with an input mode of the first sub-element of the first application being a first state; responsive to registering activation of the first one of the plurality of input controls when the first sub-element of the first application is active: change the input mode of the first sub-element of the first application to a second state, and assign a third plurality of input actions to each one of at least a second subset of the plurality of input controls; when the first sub-element of the first application is active with the input mode of the first sub-element of the first application being the second state, register a first input action of the third plurality of input actions from activation of a first one of the second subset of the plurality of input controls; and when a second sub-element of the first application is active, register a second input action of the second plurality of input actions from activation of the first one of the second subset of the plurality of input controls.

Example 40

The computer storage medium of claim 39, where the medium further includes instructions stored thereupon that, when executed by the one or more processors, cause the processors to: when the first sub-element of the first application is active, register activation of the first one of the plurality of input controls of the input device with the input mode of the first sub-element of the first application being the second state; responsive to registering activation of the first one of the plurality of input controls when the first sub-element of the first application is active with the input mode of the first sub-element of the first application being the second state: change the input mode of the first sub-element of the first application to a third state, and assign a fourth plurality of input actions to each one of at least a third subset of the plurality of input controls; when the first sub-element of the first application is active with the input mode of the first sub-element of the first application being the third state, register a first input action of the fourth plurality of input actions from activation of a first one of the third subset of the plurality of input controls; and when a second sub-element of the first application is active, register a second input action of the second plurality of input actions from activation of the first one of the fourth subset of the plurality of input controls.

Example 41

The computer storage medium of claim 33, where the medium further includes instructions stored thereupon that, when executed by the one or more processors, cause the processors to: detect a type of the input device; identify a default plurality of input actions corresponding to the detected type; responsive to identifying the default plurality of input actions: change the input mode of the first application to a default state, and assign the default plurality of input actions to each one of at least a second subset of the plurality of input controls.

Example 42

A computer storage medium having computer executable instructions stored thereon which, when executed by one or more processors, cause the one or more processors to execute a method comprising: identifying (752) a type of the input device; checking for a data entry (610) that identifies a standard mapping (354) corresponding to the type of the input device and assigning (502) input actions of the standard mapping to the input controls (204, 206, 210) of the input device (200); identifying (754) a first application that is active; checking (756) for a data entry (620) that maps a combination of the identified first application and the identified type of the input device to a corresponding alternate input mapping (370); when an entry is found for the identified first application and the identified type of the input device, obtaining (760) the corresponding alternate input mapping (370); when the first application is active, assigning (762) each input action of the corresponding alternate input mapping to one of the input controls (204, 206, 210) of the input device (200); when the first application is active, registering (400) an input action according to the corresponding alternate input mapping from activation of one of the input controls of the input device; and when a second application is active, registering (400) an input action according to the standard mapping from activation of one of the input controls of the input device.

Example 43

The computer storage medium of claim 42, where the medium further includes instructions stored thereupon that, when executed by the one or more processors, cause the processors to: when the first application (360A) is active, register a first mode control input action from activation of one of the input controls (512) selected for mode control; responsive to registering the first mode control input action when the first application is active: when an input mode of the first application is a first state: change the input mode (522A) of the first application to a second state, and assign (524A) another alternate input mapping (370) to at least a first subset of the input controls; and when the first application is active and the input mode of the first application is the second state, register (400) a first input action according to the another alternate mapping from activation of one of the first subset of the input controls.

Example 44

The computer storage medium of claim 43, where the medium further includes instructions stored thereupon that, when executed by the one or more processors, cause the processors to: when the first application is active and the input mode of the first application is the second state, register activation of the mode control and, responsive thereto: change the input mode of the first application to the first state, and assign each input action of the corresponding alternate input mapping to one of the input controls of the input device.

Example 45

The computer storage medium of claim 43, where the medium further includes instructions stored thereupon that, when executed by the one or more processors, cause the processors to: store the input mode of the first application; responsive to activation of the first application: obtain the input mode of the first application, and when the input mode of the first application is the first state, assign each input action of the corresponding alternate input mapping to one of the input controls of the input device, and when the input mode of the first application is the second state, assign the another input mapping to each one of the first subset of the plurality of input controls.

Example 46

The computer storage medium of claim 42, where the medium further includes instructions stored thereupon that, when executed by the one or more processors, cause the processors to: identify a third application that is active, where the third application includes multiple sub-elements; when a first sub-element of the third application is active, registering a second input action from activation of the mode control and, responsive thereto: when the first sub-element of the third application is active and an input mode of the first sub-element is a first state: change an input mode of the first sub-element of the third application to a second state, and assign each input action of another alternate input mapping to one of the input controls of the input device; when the first sub-element of the third application is active and the input mode is the second state, registering an input action of the another alternate input mapping from activation of one of the input controls of the input device; and when a second sub-element of the third application is active, registering an input action of the standard mapping from activation of one of the input controls of the input device.

Example 47

The computer storage medium of claim 46, where the medium further includes instructions stored thereupon that, when executed by the one or more processors, cause the processors to: when a first sub-element of the third application is active, registering a third input action from activation of the mode control and, responsive thereto: when the first sub-element of the third application is active and an input mode of the first sub-element is the second state: change an input mode of the first sub-element of the third application to a third state, and assign each input action of yet another alternate input mapping to one of the input controls of the input device; and when the first sub-element of the third application is active and the input mode is the third state, registering an input action of the yet another alternate input mapping from activation of one of the input controls of the input device.

Example 48

The computer storage medium of claim 47, where the medium further includes instructions stored thereupon that, when executed by the one or more processors, cause the processors to: store the input mode of the first, second and third sub-elements of the third application; responsive to activation of the first sub-element of the third application: obtain the input mode of the first sub-element of the third application, and when the input mode of the first sub-element of the third application is the first state, assign each input action of the corresponding alternate input mapping to one of the input controls of the input device; when the input mode of the first sub-element of the third application is the second state, assign each input action of the another alternate input mapping to one of the input controls of the input device; when the input mode of the first sub-element of the third application is the third state, assign each input action of the yet another alternate input mapping to one of the input controls of the input device.

Example 49

A computer system (800), the system (800) comprising: at least a first processor (802); and a first memory (804) in communication with the first processor (802), the first memory (804) having computer-readable instructions stored thereupon that, when executed by the first processor (802), cause the first processor (802) to perform the following operations: assign (502) one of a first plurality of input actions (354) to each one of a plurality of input controls (204, 206, 210) of an input device (200); when a first application (360A) is active, receive (452) a first user control signal corresponding to one of the input controls selected for mode control and, responsive thereto, register (454) a first input action of the first plurality of input actions from activation of the mode control; responsive to registering the first input action from activation of the mode control when the first application is active: when an input mode of the first application is a first state: change the input mode (522A) of the first application to a second state, and assign (524A) a second plurality of input actions (370A) to each one of at least a first subset of the input controls; when the first application is active and the input mode of the first application is the second state, registering (450) a first input action according to the second plurality of input actions from activation of a first one of the first subset of the input controls, processing (460) the first input action, and communicating (462) a result of the processing of the first input action to a client device for display; and when a second application is active, registering (450) a second input action in accordance with the first plurality of input actions from activation of the first one of the first subset of the input controls, processing (460) the second input action, and communicating (462) a result of the processing of the second input action to the client device for display.

Example 50

The computer system of claim 49, wherein: the first application includes at least a first sub-element; when the first sub-element of the first application is active, registering a third input action from activation of the mode control when the first sub-element of the first application is active and, responsive thereto: when the first sub-element of the first application is active and an input mode of the first sub-element is a first state: change an input mode of the first sub-element of the first application to a second state, and assign a third plurality of input actions to each one of at least a second subset of the plurality of input controls; when the first sub-element of the first application is active and the input mode is the second state, registering a first input action of the third plurality of input actions from activation of a first one of the second subset of the plurality of input controls, processing the first input action of the third plurality of input actions, and communicating a result of the processing of the first input action of the third plurality of input actions to the client device for display; and when a second sub-element of the first application is active, registering a second input action of the second plurality of input actions from activation of the first one of the second subset of the plurality of input controls, processing the second input action of the second plurality of input actions, and communicating a result of the processing of the second input action of the second plurality of input actions to the client device for display.

Example 51

The computer system of claim 50, wherein the sub-elements of the first application include one or more of windows, documents, and split screens.

Example 52

The computer system of claim 49, the method further including: storing the input mode of the first application; responsive to activation of the second application, assigning the first plurality of input actions to the plurality of input controls; and responsive to activation of the first application: obtain the input mode of the first application, and when the input mode of the first application is the second state, assigning the second plurality of input actions to each one of the first subset of the plurality of input controls.

Example 53

The computer system of claim 49, the method further including: when the first application is active and the input mode of the first application is the second state, registering activation of the mode control and, responsive thereto, when the input mode of the first application is the second state: change the input mode of the first application to the first state, and assign the first plurality of input actions to the plurality of input controls.

Example 54

The computer system of claim 49, wherein: when the first application is active, registering activation of the mode control and, responsive thereto: when the input mode of the first application is the second state: change the input mode of the first application to a third state, and assign a third plurality of input actions to each one of at least a second subset of the plurality of input controls; and when the input mode of the first application is the third state, registering a first input action in accordance with the third plurality of input actions from activation of a first one of the second subset of the plurality of input controls, processing the first input action in accordance with the third plurality of input actions, and communicating a result of the processing of the first input action in accordance with the third plurality of input actions to the client device for display.

Example 55

The computer system of claim 49, wherein: the first application includes a plurality of sub-elements; when a first sub-element of the first application is active, registering activation of the first one of the plurality of input controls of the input device with an input mode of the first sub-element of the first application being a first state; responsive to registering activation of the first one of the plurality of input controls when the first sub-element of the first application is active: change the input mode of the first sub-element of the first application to a second state, and assign a third plurality of input actions to each one of at least a second subset of the plurality of input controls; when the first sub-element of the first application is active with the input mode of the first sub-element of the first application being the second state, registering a first input action of the third plurality of input actions from activation of a first one of the second subset of the plurality of input controls, processing the first input action of the third plurality of input actions, and communicating a result of the processing of the first input action of the third plurality of input actions to the client device for display; and when a second sub-element of the first application is active, registering a second input action of the second plurality of input actions from activation of the first one of the second subset of the plurality of input controls, processing the second input action of the second plurality of input actions, and communicating a result of the processing of the second input action of the second plurality of input actions to the client device for display.

Example 56

The computer system of claim 55, wherein: when the first sub-element of the first application is active, registering activation of the first one of the plurality of input controls of the input device with the input mode of the first sub-element of the first application being the second state; responsive to registering activation of the first one of the plurality of input controls when the first sub-element of the first application is active with the input mode of the first sub-element of the first application being the second state: change the input mode of the first sub-element of the first application to a third state, and assign a fourth plurality of input actions to each one of at least a third subset of the plurality of input controls; when the first sub-element of the first application is active with the input mode of the first sub-element of the first application being the third state, registering a first input action of the fourth plurality of input actions from activation of a first one of the third subset of the plurality of input controls, processing the first input action of the fourth plurality of input actions, and communicating a result of the processing of the first input action of the fourth plurality of input actions to the client device for display; and when a second sub-element of the first application is active, registering a second input action of the second plurality of input actions from activation of the first one of the fourth subset of the plurality of input controls, processing the second input action of the second plurality of input actions, and communicating a result of the processing of the second input action of the second plurality of input actions to the client device for display.

Example 57

The computer system of claim 49, the method further including: detecting a type of the input device; identifying a default plurality of input actions corresponding to the detected type; responsive to identifying the default plurality of input actions: change the input mode of the first application to a default state, and assign the default plurality of input actions to each one of at least a second subset of the plurality of input controls.

What is claimed is:

1. A method for adapting input action assignments for input controls of an input device, the method comprising:
assigning one of a first plurality of input actions to each one of the plurality of input controls of the input device, wherein the first plurality of input actions includes commands assigned to controls of the input device for controlling a first application;
when the first application is active, registering a first input action of the first plurality of input actions from activation of one of the input controls selected for mode control;
responsive to registering the first input action from activation of the mode control when the first application is active:
when an input mode of the first application is a first state:
changing the input mode of the first application to a second state, and
assigning a second plurality of input actions to at least some of the input controls, wherein the second plurality of input actions includes commands assigned to controls of the input device for controlling a second application;
when the first application is active and the input mode of the first application is the second state, registering a first input action according to the second plurality of input actions from activation of a first one of the first subset of the input controls; and
when the second application is active, registering a second input action in accordance with the first plurality of input actions from activation of the first one of the first subset of the input controls.

2. The method of claim 1, wherein:
the first application includes at least a first sub-element capable of providing functionality;
when the first sub-element of the first application is active, registering a third input action from activation of the mode control when the first sub-element of the first application is active and, responsive thereto:
when the first sub-element of the first application is active and an input mode of the first sub-element is a first state:
change an input mode of the first sub-element of the first application to a second state, and
assign a third plurality of input actions to each one of at least a second subset of the plurality of input controls, wherein the third plurality of input actions includes commands assigned to controls of the input device for controlling the first sub-element;
when the first sub-element of the first application is active and the input mode is the second state, registering a first input action of the third plurality of input actions from activation of a first one of the second subset of the plurality of input controls; and
when a second sub-element of the first application is active, registering a second input action of the second plurality of input actions from activation of the first one of the second subset of the plurality of input controls.

3. The method of claim 1, the method further including:
storing the input mode of the first application;
responsive to activation of the second application, assigning the first plurality of input actions to the plurality of input controls; and
responsive to activation of the first application:
obtain the input mode of the first application, and
when the input mode of the first application is the second state, assigning the second plurality of input actions to each one of the first subset of the plurality of input controls.

4. The method of claim 1, the method further including:
when the first application is active and the input mode of the first application is the second state, registering activation of the mode control and, responsive thereto, when the input mode of the first application is the second state:
change the input mode of the first application to the first state, and
assign the first plurality of input actions to the plurality of input controls.

5. The method of claim 1, wherein:
when the first application is active, registering activation of the mode control and, responsive thereto:
when the input mode of the first application is the second state:
change the input mode of the first application to a third state, and
assign a third plurality of input actions to each one of at least a second subset of the plurality of input controls, wherein the third plurality of input actions includes commands assigned to controls of the input device; and
when the input mode of the first application is the third state, registering a first input action in accordance with the third plurality of input actions from activation of a first one of the second subset of the plurality of input controls.

6. The method of claim 1, wherein:
the first application includes a plurality of application sub-elements capable of providing functionality;
when a first sub-element of the first application is active, registering activation of the first one of the plurality of input controls of the input device with an input mode of the first sub-element of the first application being a first state;
responsive to registering activation of the first one of the plurality of input controls when the first sub-element of the first application is active:
change the input mode of the first sub-element of the first application to a second state, and
assign a third plurality of input actions to each one of at least a second subset of the plurality of input controls, wherein the third plurality of input actions includes commands assigned to controls of the input device for controlling the first sub-elements;
when the first sub-element of the first application is active with the input mode of the first sub-element of the first application being the second state, registering a first input action of the third plurality of input actions from activation of a first one of the second subset of the plurality of input controls; and
when a second sub-element of the first application is active, registering a second input action of the second plurality of input actions from activation of the first one of the second subset of the plurality of input controls.

7. The method of claim 6, wherein:
when the first sub-element of the first application is active, registering activation of the first one of the plurality of input controls of the input device with the input mode of the first sub-element of the first application being the second state;
responsive to registering activation of the first one of the plurality of input controls when the first sub-element of the first application is active with the input mode of the first sub-element of the first application being the second state:
changing the input mode of the first sub-element of the first application to a third state, and
assigning a fourth plurality of input actions to each one of at least a third subset of the plurality of input controls, wherein the fourth plurality of input actions includes commands assigned to controls of the input device;
when the first sub-element of the first application is active with the input mode of the first sub-element of the first application being the third state, registering a first input action of the fourth plurality of input actions from activation of a first one of the third subset of the plurality of input controls; and
when a second sub-element of the first application is active, registering a second input action of the second plurality of input actions from activation of the first one of the fourth subset of the plurality of input controls.

8. The method of claim 1, the method further including:
detecting a type of the input device;
identifying a default plurality of input actions corresponding to the detected type;
responsive to identifying the default plurality of input actions:
change the input mode of the first application to a default state, and
assign the default plurality of input actions to each one of at least a second subset of the plurality of input controls.

9. A method for assigning alternate input action assignments for input controls of an input device that are application specific, the method comprising:
identifying a type of the input device;
identifying a standard input mapping corresponding to the type of the input device, the standard input mapping including a file containing a mapping assignment of standard input actions to input controls for the input device for controlling a second application, and assigning the input actions of the standard input mapping to the input controls of the input device;
identifying the first application that is active;
obtaining an alternate input mapping for the identified type of the input device when used with the first application, the alternate input mapping including a file containing a mapping assignment of alternate input actions to input controls to the input device for controlling the first application;
when the first application is active, assigning each input action of the corresponding alternate input mapping to one of the input controls of the input device;
when the first application is active, registering an input action according to the corresponding alternate input mapping from activation of one of the input controls of the input device; and when the second application is active, registering an input action according to the standard mapping from activation of one of the input controls of the input device.

10. The method of claim 9, the method further including:
when the first application is active, registering a first mode control input action from activation of one of the input controls selected for mode control;
responsive to registering the first mode control input action when the first application is active:
when an input mode of the first application is a first state:
change the input mode of the first application to a second state, and
assign another alternate input mapping to at least a first subset of the input controls; and
when the first application is active and the input mode of the first application is the second state, registering a first input action according to the another alternate input mapping from activation of one of the first subset of the input controls.

11. The method of claim 10, the method further including:
when the first application is active and the input mode of the first application is the second state, registering activation of the mode control and, responsive thereto:
change the input mode of the first application to the first state, and
assign each input action of the corresponding alternate input mapping to one of the input controls of the input device.

12. The method of claim 10, the method further including:
storing the input mode of the first application;
responsive to activation of the first application:
obtain the input mode of the first application, and
when the input mode of the first application is the first state, assign each input action of the corresponding alternate input mapping to one of the input controls of the input device, and
when the input mode of the first application is the second state, assigning the another input mapping to each one of the first subset of the plurality of input controls.

13. The method of claim 9, the method further including:
a third application that includes multiple application sub-elements capable of providing functionality;
when a first sub-element of the third application is active, registering a second input action from activation of the mode control and, responsive thereto:
when the first sub-element of the third application is active and an input mode of the first sub-element is a first state:
change an input mode of the first sub-element of the third application to a second state, and
assign each input action of another alternate input mapping to one of the input controls of the input device;
when the first sub-element of the third application is active and the input mode is the second state, registering an input action of the another alternate input mapping from activation of one of the input controls of the input device; and
when a second sub-element of the third application is active, registering an input action of the standard mapping from activation of one of the input controls of the input device.

14. The method of claim 13, wherein:
when a first sub-element of the third application is active, registering a third input action from activation of the mode control and, responsive thereto:

when the first sub-element of the third application is active and an input mode of the first sub-element is the second state:
change an input mode of the first sub-element of the third application to a third state, and
assign each input action of yet another alternate input mapping to one of the input controls of the input device; and
when the first sub-element of the third application is active and the input mode is the third state, registering an input action of the yet another alternate input mapping from activation of one of the input controls of the input device.

15. The method of claim 14, the method further including:
storing the input mode of the first, second and third sub-elements of the third application;
responsive to activation of the first sub-element of the third application:
obtain the input mode of the first sub-element of the third application, and
when the input mode of the first sub-element of the third application is the first state, assign each input action of the corresponding alternate input mapping to one of the input controls of the input device;
when the input mode of the first sub-element of the third application is the second state, assign each input action of the another alternate input mapping to one of the input controls of the input device;
when the input mode of the first sub-element of the third application is the third state, assign each input action of the yet another alternate input mapping to one of the input controls of the input device.

16. A system, the system comprising:
a processor;
an input device;
a display; and
a non-transitory memory in communication with the processor, the memory having computer-readable instructions stored thereupon that, when executed by the processor, cause the processor to perform a method comprising:
assigning one of a first plurality of input actions to each one of the plurality of input controls of the input device, wherein the first plurality of input actions includes commands assigned to controls of the input device;
registering a first input action of the first plurality of input actions from activation of one of the input controls selected for mode control;
responsive to registering the first input action from activation of the mode control:
when an input mode of the first application is a first state:
change the input mode of the first application to a second state, and
assign a second plurality of input actions to at least some of the input controls, wherein the second plurality of input actions includes commands assigned to controls of the input device;
when the input mode of the first application is the second state, registering a first input action according to the second plurality of input actions from activation of a first one of the first subset of the input controls; and
registering a second input action in accordance with the first plurality of input actions from activation of the first one of the first subset of the input controls.

17. The system of claim 16, wherein the first application includes at least a first sub-element and the memory further includes instructions stored thereupon that, when executed by the processor, cause the processor to:
register a third input action from activation of the mode control for the first sub-element of the first application and, responsive thereto:
when an input mode of the first sub-element is a first state:
change the input mode of the first sub-element of the first application to a second state, and
assign a third plurality of input actions to each one of at least a second subset of the plurality of input controls, wherein the third plurality of input actions includes commands assigned to controls of the input device for controlling the second sub element;
when the input mode of the first sub-element of the first application is the second state, register a first input action of the third plurality of input actions from activation of a first one of the second subset of the plurality of input controls; and
for a second sub-element of the first application, register a second input action of the second plurality of input actions from activation of the first one of the second subset of the plurality of input controls.

18. The system of claim 16, where the memory further includes instructions stored thereupon that, when executed by the processor, cause the processor to:
store the input mode of the first application;
assign the first plurality of input actions to the plurality of input controls for the second application; and
for the first application:
obtain the input mode of the first application, and
when the input mode of the first application is the second state, assign the second plurality of input actions to each one of the first subset of the plurality of input controls.

19. The system of claim 16, where the memory further includes instructions stored thereupon that, when executed by the processor, cause the processor to:
when the input mode of the first application is the second state, register activation of the mode control and, responsive thereto, when the input mode of the first application is the second state:
change the input mode of the first application to the first state, and
assign the first plurality of input actions to the plurality of input controls.

20. The system of claim 16, where the memory further includes instructions stored thereupon that, when executed by the processor, cause the processor to:
register activation of the mode control for the first application and, responsive thereto:
when the input mode of the first application is the second state:
change the input mode of the first application to a third state, and
assign a third plurality of input actions to each one of at least a second subset of the plurality of input controls, wherein the third plurality of input actions includes commands assigned to controls of the input device; and
when the input mode of the first application is the third state, register a first input action in accordance with the third plurality of input actions from activation of a first one of the second subset of the plurality of input controls.

* * * * *